(12) United States Patent
Quintas et al.

(10) Patent No.: US 12,299,463 B2
(45) Date of Patent: May 13, 2025

(54) DYNAMIC GENERATION OF GRAPHICAL USER INTERFACES FOR RETRIEVING DATA FROM MULTIPLE COMPUTING SYSTEMS

(71) Applicant: OneTrust, LLC, Atlanta, GA (US)

(72) Inventors: Dan Quintas, Smyrna, GA (US); Sohail Jooma, Sandy Springs, GA (US); Raghavendra Gururaj, Cumming, GA (US); Ravi Bhattiprolu, Cumming, GA (US); Brett A. Curtis, Sandy Springs, GA (US); Alexander Heavner, Roswell, GA (US); Jose Daniel Beita, Atlanta, GA (US)

(73) Assignee: One Trust, LLC, Atlanta, GA (US)

( * ) Notice: Subject to any disclaimer, the term of this patent is extended or adjusted under 35 U.S.C. 154(b) by 10 days.

(21) Appl. No.: 18/336,525

(22) Filed: Jun. 16, 2023

(65) Prior Publication Data

US 2023/0409353 A1    Dec. 21, 2023

Related U.S. Application Data

(60) Provisional application No. 63/353,421, filed on Jun. 17, 2022.

(51) Int. Cl.
*G06F 9/451* (2018.01)
*G06F 3/0481* (2022.01)
(Continued)

(52) U.S. Cl.
CPC ............ *G06F 9/451* (2018.02); *G06F 3/0481* (2013.01); *G06F 3/0484* (2013.01); *G06F 11/3495* (2013.01)

(58) Field of Classification Search
CPC ...... G06F 9/451; G06F 3/0481; G06F 3/0484; G06F 11/3495
See application file for complete search history.

(56) References Cited

U.S. PATENT DOCUMENTS 5,644,611 A * 7/1997 McShane ............. H04N 1/3875
382/282
6,016,438 A * 1/2000 Wakayama ............. G06T 19/00
324/309

(Continued)

OTHER PUBLICATIONS

1 Notice of Allowance, dated Jul. 7, 2023, from corresponding U.S. Appl. No. 17/977,285.

*Primary Examiner* — Nicholas Augustine
(74) *Attorney, Agent, or Firm* — Keller Preece PLLC

(57) ABSTRACT

Aspects of the present invention provide methods, systems, and/or the like for (1) receiving a set of delegates; (2) generating a corresponding GUI for each delegate in the set of delegates, wherein the corresponding GUI is configured with a respective display element that provides a request for the corresponding data unit and an input element for receiving the corresponding data unit; (3) generating at least one corresponding delegate record for each delegate of the set of delegates, wherein the at least one corresponding delegate record identifies the corresponding data unit and the corresponding graphical user interface and is stored in a centralized repository; (4) generating a corresponding electronic communication for each delegate of the set of delegates, wherein the corresponding electronic communication comprises a link to access the corresponding GUI; and (5) sending the corresponding electronic communication for each delegate of the set of delegates to the corresponding assignee.

20 Claims, 8 Drawing Sheets

(51) Int. Cl.
    *G06F 3/0484*     (2022.01)
    *G06F 11/34*     (2006.01)
    *G06F 9/44*     (2018.01)

(56) References Cited

U.S. PATENT DOCUMENTS

| | | | | |
|---|---|---|---|---|
| 6,049,622 A * | 4/2000 | Robb | G06T 19/003 | 715/810 |
| 6,108,573 A * | 8/2000 | Debbins | G01R 33/54 | 345/157 |
| 6,111,573 A * | 8/2000 | McComb | G09G 5/363 | 715/764 |
| 6,182,127 B1 * | 1/2001 | Cronin, III | G06F 16/9577 | 709/200 |
| 6,502,114 B1 * | 12/2002 | Forcier | G06F 3/0488 | 715/273 |
| 6,510,459 B2 * | 1/2003 | Cronin, III | G06F 16/9577 | 709/200 |
| 7,034,860 B2 * | 4/2006 | Lia | H04N 7/152 | 709/204 |
| 7,417,644 B2 * | 8/2008 | Cooper | G06F 9/451 | 345/619 |
| 7,647,338 B2 * | 1/2010 | Lazier | G06F 3/04817 | 707/999.102 |
| 7,676,763 B2 * | 3/2010 | Rummel | G06F 3/0482 | 715/845 |
| 7,730,425 B2 * | 6/2010 | de los Reyes | G06F 9/451 | 715/834 |
| 8,245,156 B2 * | 8/2012 | Mouilleseaux | G06F 3/04883 | 715/834 |
| 8,279,174 B2 * | 10/2012 | Jee | H04M 1/0268 | 345/157 |
| 8,381,133 B2 * | 2/2013 | Iwema | G06F 3/0488 | 715/845 |
| 8,549,432 B2 * | 10/2013 | Warner | G06F 3/04817 | 715/834 |
| 8,601,389 B2 * | 12/2013 | Schulz | G06F 3/0482 | 715/810 |
| 8,996,987 B2 * | 3/2015 | Rivera | G06F 3/0481 | 715/830 |
| 11,682,399 B2 | 6/2023 | Paulraj et al. | | |
| 2003/0011638 A1 * | 1/2003 | Chung | G06F 3/0482 | 715/808 |
| 2003/0158832 A1 * | 8/2003 | Sijacic | G06F 8/34 | |
| 2004/0230940 A1 * | 11/2004 | Cooper | G06F 9/451 | 717/162 |
| 2005/0091596 A1 * | 4/2005 | Anthony | G11B 27/34 | 715/848 |
| 2005/0228250 A1 * | 10/2005 | Bitter | A61B 34/20 | 600/407 |
| 2005/0251021 A1 * | 11/2005 | Kaufman | A61B 6/00 | 600/407 |
| 2005/0278647 A1 * | 12/2005 | Leavitt | G06F 3/04817 | 715/779 |
| 2006/0013462 A1 * | 1/2006 | Sadikali | G16H 30/40 | 382/128 |
| 2007/0130519 A1 * | 6/2007 | Tilford | G06F 40/166 | 715/236 |
| 2007/0176898 A1 * | 8/2007 | Suh | H04M 1/72469 | 345/158 |
| 2007/0180397 A1 * | 8/2007 | Hoyer | G06F 3/04886 | 715/780 |
| 2008/0036743 A1 * | 2/2008 | Westerman | G06F 3/038 | 345/173 |
| 2008/0201315 A1 * | 8/2008 | Lazier | G06F 16/3325 | 707/999.005 |
| 2008/0218533 A1 * | 9/2008 | Goto | H04M 1/72403 | 345/661 |
| 2009/0144741 A1 * | 6/2009 | Tsuda | G06F 9/5027 | 718/104 |
| 2009/0309849 A1 * | 12/2009 | Iwema | G06F 3/0488 | 345/173 |
| 2009/0327964 A1 * | 12/2009 | Mouilleseaux | G06F 3/04883 | 715/834 |
| 2010/0192103 A1 * | 7/2010 | Cragun | G06F 3/0488 | 715/834 |
| 2011/0154268 A1 * | 6/2011 | Trent, Jr. | G06F 3/017 | 715/863 |
| 2011/0252346 A1 * | 10/2011 | Chaudhri | G06F 3/0488 | 715/765 |
| 2012/0013540 A1 * | 1/2012 | Hogan | G06F 40/177 | 345/173 |
| 2012/0136905 A1 * | 5/2012 | Pullara | G06F 16/904 | 707/E17.005 |
| 2012/0278725 A1 * | 11/2012 | Gordon | H04N 21/858 | 715/738 |
| 2013/0067391 A1 * | 3/2013 | Pittappilly | G06F 3/0482 | 715/781 |
| 2013/0091471 A1 * | 4/2013 | Gutt | G06F 16/54 | 715/848 |
| 2013/0218980 A1 * | 8/2013 | Vins | G06Q 10/10 | 709/206 |
| 2014/0075286 A1 * | 3/2014 | Harada | G06F 40/103 | 715/234 |
| 2014/0303961 A1 * | 10/2014 | Leydon | G06F 40/51 | 704/2 |
| 2022/0027830 A1 * | 1/2022 | Mouawad | G06Q 10/0639 | |

* cited by examiner

DYNAMIC GENERATION OF GRAPHICAL USER INTERFACES FOR RETRIEVING DATA FROM MULTIPLE COMPUTING SYSTEMS

CROSS-REFERENCE TO RELATED APPLICATIONS

This application claims the benefit of U.S. Provisional patent application Ser. No. 63/353,421, filed Jun. 17, 2022, the entire disclosure of which is hereby incorporated herein by reference in its entirety.

TECHNICAL FIELD

The present disclosure is generally related to systems and methods for data processing of electronic information from multiple data sources that is gathered, associated, created, formatted, edited, prepared, or otherwise processed in forming a unified collection of data units storable for a distinct entity.

BACKGROUND

Many activities, processes, enterprises, and/or the like conducted by entities, such as corporations, organizations, institutions, etc., involve the use of data that may be provided through multiple, separate data sources. These data sources may involve different types of computing components and these computing components may be located on different computing systems. For example, the different types of computing components may involve different data repositories that are made up of computing components such as servers, routers, data storage, networks, and/or the like that are used on a computing system to store and manage data for the computing system. These different computing systems may be located in different locations from each other, may be maintained and managed by different departments and/or personnel, may require different credentials for accessing, may be controlled by external third parties, etc. Therefore, for many entities, retrieving data from multiple data sources for use with some activity, process, enterprises, and/or the like can pose a considerable technical challenge. Therefore, a need exists in the arts for accessing, retrieving, and processing data stored within data sources located on multiple computing systems. Accordingly, various aspects of the disclosure provided herein address such a need.

SUMMARY

In general, various aspects of the present disclosure provide methods, apparatuses, systems, computing devices, computing entities, and/or the like. In In accordance with various aspects, a system is provided comprising a non-transitory computer-readable medium storing instructions and a processing device communicatively coupled to the non-transitory computer-readable medium. The processing device is configured to execute the instructions and thereby perform operations including: (1) receiving a set of delegates that represent a plurality of data units stored within a plurality of computing systems and a plurality of assignees who have access to the plurality of data units stored within the plurality of computing systems, wherein each delegate of the set of delegates comprises a data construct identifying a corresponding data unit from the plurality of data units and a corresponding assignee from the plurality of assignees who has access to a corresponding computing system from the plurality of computing systems to retrieve the corresponding data unit; (2) generating and configuring a respective customized graphical user interface for each delegate of the set of delegates to include a respective display element that includes a request for the corresponding data unit and an input element for receiving the corresponding data unit; (3) generating a corresponding delegate record for each delegate of the set of delegates, wherein the corresponding delegate record identifies the corresponding data unit and the respective customized graphical user interface and is stored in a centralized repository; (4) generating a corresponding electronic communication for each delegate of the set of delegates, wherein the corresponding electronic communication comprises a link to access the respective customized graphical user interface; (5) identifying, for each delegate, a respective assignee from the plurality of assignees; (6) transmitting the corresponding electronic communication for each delegate of the set of delegates to the respective assignee; (7) receiving an indication of an activation of the link in the corresponding electronic communication on a computing device associated with the respective assignee; and (8) responsive to receiving the indication of the activation of the link, causing the computing device to access the respective customized graphical user interface.

In some aspects, the operations further comprise: (1) receiving, from the computing device via the respective customized graphical user interface, the corresponding data unit for a particular delegate of the set of delegates; and (2) recording the corresponding data unit for the particular delegate in the corresponding delegate record for the particular delegate. In other aspects, the operations further comprise: (1) receiving a subsequent request associated with the corresponding data unit; and (2) responsive to receiving the subsequent request: (A) modifying, based on the subsequent request, the respective customized graphical user interface to generate a modified graphical user interface for the particular delegate, wherein the modified graphical user interface requests additional data that is required for the corresponding data unit; and (B) generating a second corresponding electronic communication for the particular delegate that includes a second link to access the modified graphical user interface.

In some aspects, the operations further comprise: (1) receiving an indication of an activation of the second link in the second corresponding electronic communication on the computing device; (2) responsive to receiving the indication of the activation of the second link, causing the computing device to access the modified graphical user interface; (3) receiving, from the computing device via the modified graphical user interface, the additional data; and (4) modifying the corresponding data unit for the particular delegate in the corresponding delegate record for the particular delegate to include the additional data. In some aspects, the operations further comprise: (1) identifying a data type of the corresponding data unit; (2) determining that the data type is not a desired data type; (3) responsive to determining that the data type is not the desired data type, facilitating correction of the corresponding data unit from the data type to the desired data type.

In some aspects, facilitating correction of the corresponding data unit from the data type to the desired data type comprises at least one of: (1) transforming the corresponding data unit from the data type to the desired data type; or (2) generating a second modified graphical user interface that includes a second display element that includes a second request for the corresponding data unit in the desired data type and a second input element for receiving the corresponding data unit in the desired data type and providing the second modified graphical user interface for display on the computing device.

In various aspects, the operations further comprise, in response to receiving each of the plurality of data units: (1) accessing at least one of the plurality of data units from the corresponding delegate record; and (2) initiating network communication for transferring the at least one of the plurality of data units to a third-party computing system. In other aspects, the operations further comprise: (1) analyzing the plurality of data units against a set of metrics to identify a performance gap; and (2) facilitating, based on the performance gap, modification of at least one operating parameter controlled by at least one computing system from the plurality of computing systems.

In accordance with various aspects, a method is provided. Accordingly, the method comprises: (1) receiving, by computing hardware, a set of delegates; (2) generating, by the computing hardware, a corresponding graphical user interface for each delegate of the set of delegates, wherein the corresponding graphical user interface is configured with a respective display element that provides a request for the corresponding data unit and an input element for receiving the corresponding data unit; (3) generating, by the computing hardware, at least one corresponding delegate record for each delegate of the set of delegates, wherein the at least one corresponding delegate record identifies the corresponding data unit and the corresponding graphical user interface and is stored in a centralized repository; (4) generating, by the computing hardware, a corresponding electronic communication for each delegate of the set of delegates, wherein the corresponding electronic communication comprises a link to access the corresponding graphical user interface; and (5) sending, by the computing hardware, the corresponding electronic communication for each delegate of the set of delegates to the corresponding assignee. In some aspects, the set of delegates represent a plurality of data units stored within a plurality of computing systems and a plurality of assignees who have access to the plurality of data units stored within the plurality of computing systems, and each delegate of the set of delegates comprises a data construct identifying a corresponding data unit from the plurality of data units and a corresponding assignee from the plurality of assignees who has access to a corresponding computing system from the plurality of computing systems to retrieve the corresponding data unit.

In some aspects, the method further comprises: (1) receiving, by the computing hardware, an indication of an assignee computing device associated with the corresponding assignee for a particular delegate of the set of delegates activating the link provided in the corresponding electronic communication sent for the particular delegate; (2) responsive to receiving the indication, providing, by the computing hardware, the corresponding graphical user interface for the particular delegate for display on the assignee computing device; (3) receiving, by the computing hardware from the assignee computing device, the corresponding data unit for the particular delegate; and (4) recording, by the computing hardware, the corresponding data unit for the particular delegate in the at least one corresponding delegate record for the particular delegate. In particular aspects, the method comprises receiving, by the computing hardware and from a user account having permission to approve the corresponding data unit for the particular delegate, instruction for the corresponding data unit. In still other aspects, the method comprises, responsive to receiving the instruction: (1) modifying, by the computing hardware and based on the instruction, the corresponding graphical user interface to generate a modified graphical user interface for the particular delegate, wherein the modified graphical user interface requests additional data that is required for the corresponding data unit; (2) generating, by the computing hardware, a second electronic communication for the particular delegate, wherein the second electronic communication comprises a link to access the modified graphical user interface; and (3) sending, by the computing hardware, the second electronic communication for the particular delegate to the corresponding assignee for the particular delegate, wherein upon receipt of the second electronic communication, the corresponding assignee activates the link to access the modified graphical user interface and provide the additional data that is required for the corresponding data unit.

In some aspects, the method comprises one or more of: (1) receiving, by the computing hardware, a second indication of the corresponding assignee for the particular delegate activating the link provided in the second electronic communication; (2) responsive to receiving the second indication, providing, by the computing hardware, the modified graphical user interface for display to the corresponding assignee for the particular delegate; (3) receiving, by the computing hardware, the additional data that is required for the corresponding data unit for the particular delegate; and/or (4) recording, by the computing hardware, the additional data that is required for the corresponding data unit for the particular delegate in the at least one corresponding delegate record for the particular delegate. In particular aspects, upon completion of retrieving the plurality of data units, the method further comprises: (1) accessing, by the computing hardware, at least one of the plurality of data units from the at least one corresponding delegate record; (2) generating, by the computing hardware and based on the at least one of the plurality of data units, a report; and (3) providing, by the computing hardware, at least one of a hard copy version of the report for printing or an electronic version of the report for display on a graphical user interface. In other aspects, upon completion of retrieving the plurality of data units, the method further comprises: (1) accessing, by the computing hardware, at least one of the plurality of data units from the at least one corresponding delegate record; and (2) submitting, by the computing hardware, the at least one of plurality of data units to a third-party computing system.

In particular aspects, the method comprises: (1) analyzing, by the computing hardware, the plurality of data units against a set of metrics; (2) identifying, by the computing hardware performance gaps according to the set of metrics based on the analysis; and (3) modifying, by the computing hardware, one or more operating parameters for one or more of the plurality of computing systems based on the performance gaps.

In addition, in accordance with various aspects, a non-transitory computer-readable medium having program code that is stored thereon. The program code executable by one or more processing devices performs operations similar to the steps recited above for the method. In particular aspects, the operations comprise: (1) receiving a set of delegates that represent a plurality of data units stored within a plurality of computing systems and a plurality of assignees who have access to the plurality of data units stored within the plurality of computing systems, wherein each delegate of the set of delegates comprises a data construct identifying a corresponding data unit from the plurality of data units and a corresponding assignee from the plurality of assignees who has access to a corresponding computing system from the plurality of computing systems to retrieve the corresponding data unit; (2) generating and configuring a respective customized graphical user interface for each delegate of the set of delegates to include a respective display element that includes a request for the corresponding data unit and an input element for receiving the corresponding data unit; (3) generating a corresponding delegate record for each delegate of the set of delegates, wherein the corresponding delegate record identifies the corresponding data unit and the respective customized graphical user interface and is stored in a centralized repository; (4) identifying, for each delegate, a respective assignee from the plurality of assignees; (5) providing, to a respective computing device in network communication with a respective computing system of the plurality of computing systems and associated with the respective assignee, the respective customized graphical user interface for display on the respective computing device; (6) receiving, from each respective computing device via the respective customized graphical user interface, the corresponding data unit for each delegate of the set of delegates; and (7) recording the corresponding data unit for each respective delegate in the corresponding delegate record for the particular delegate.

In some aspects, the operations further comprise: (1) identifying a respective data type of each corresponding data unit; (2) identifying a subset of the plurality of data units for which the respective data type is not a desired data type; and (3) facilitating modification of the corresponding data unit for each data unit in the subset of the plurality of data units to the desired data type. In various aspects, facilitating modification of the corresponding data unit for each data unit in the subset of the plurality of data units to the desired data type comprises at least one of: (1) transforming the corresponding data unit for each data unit in the subset of the plurality of data units to the desired data type; or (2) generating a respective modified graphical user interface that includes a second display element that includes a second request for the corresponding data unit in the desired data type and a second input element for receiving the corresponding data unit in the desired data type and providing the second modified graphical user interface for display on the each computing device.

In some aspects, the operations further comprise, in response to receiving the corresponding data unit for each delegate of the set of delegates: (1) accessing at least one of the plurality of data units from the corresponding delegate record; and (2) initiating network communication for transferring the at least one of the plurality of data units to a third-party computing system. In other embodiments, the operations further comprise: (1) analyzing the plurality of data units against a set of metrics to identify a performance gap; and (2) facilitating, based on the performance gap, modification of at least one operating parameter controlled by at least one computing system from the plurality of computing systems.

BRIEF DESCRIPTION OF THE DRAWINGS

In the course of this description, reference will be made to the accompanying drawings, which are not necessarily drawn to scale, and wherein.

DETAILED DESCRIPTION

Overview

Figure 1:
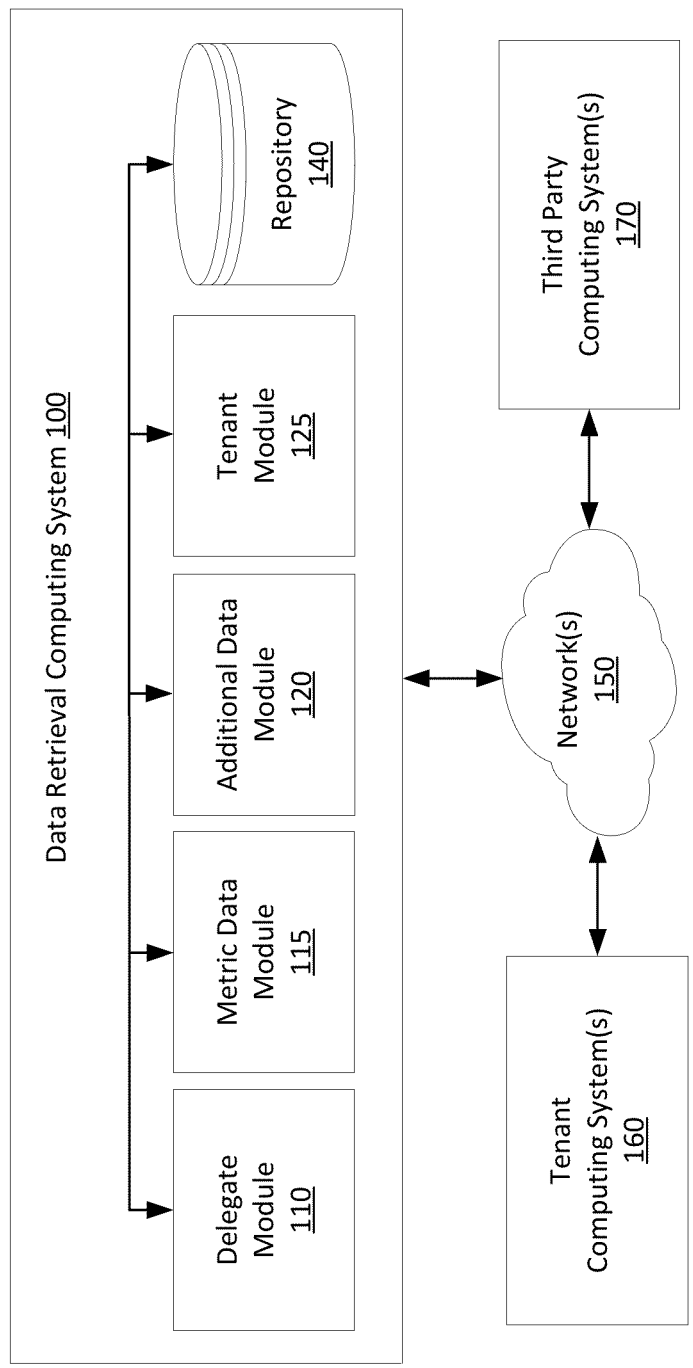
FIG. 1 depicts an example of a computing environment that can be used for accessing, retrieving, and processing data units stored within data sources located on multiple computing systems according to various aspects.

As noted, many activities, processes, enterprises, and/or the like conducted by entities, such as corporations, organizations, institutions, etc., involve the use of data that may be provided through a computing environment made up of multiple, separate data sources. For many entities, performing any type of computational activities, processes, enterprises, and/or the like involving processing data that originates from multiple data sources can pose considerable technical challenges. For example, computational software that pulls together and/or processes data from multiple data sources found within a computing environment can encounter technical challenges in retrieving the data from the multiple data sources. Computational software that may be used in collecting and tracking the data for the individual data sources within the computing environment from which the data is retrieved may for example, be incompatible with other computing software used for collecting and tracking the data for other individual data sources within the computing environment. Other aspects of computational software may be incompatible with the computational software used in pulling together and/or processing the data, making it very difficult, if not impossible, to gather and process the data needed from the multiple data sources. This may be particularly true when data stored in distinctive data sources is stored in distinctive and/or incompatible data formats.

Another potential source of incompatibility for the computational software used in pulling together and/or processing the data is that the computational software may need to interface, communicate, and/or the like with various hardware components such as servers, routers, data storage, networks, and/or the like that make up the computing environment in which the data sources are found. Again, the computational software may not have the compatibility and/or functionality (e.g., application programming interface(s)) necessary to enable the software to interface, communicate, and/or the like with the different hardware components found within the computing environment, making it very difficult, if not impossible, for the computational software to gather the data needed from the different data sources. This can be especially true as hardware components are added, removed, and/or modified within the computing environment.

An additional technical challenge is that computational software used in pulling together and/or processing the data can encounter different access and/or management controls for the different data sources found within the computing environment. Accordingly, the computational software is often required to access, process, maintain, and/or the like different credentials needed for retrieving data from the different data sources. This can pose a significant technical challenge in that the computational software may require functionality to manage the credentials and track which credentials are applicable to which data sources, as well as manage the credentials in a secure manner so that they are not exposed to unauthorized parties.

Still another technical challenge the computational software used in pulling together and/or processing data is that such computational software is required to retrieve data from multiple data sources in the computing environment that are located (e.g. spread) over considerable distances and/or with a considerable number of hardware components that are involved with the computational software retrieving the data from the multiple data sources. Such configurations can pose a significant technical challenge in that the computational software can encounter performance issues in retrieving the data from the multiple data sources that are located over considerable distances and/or are involved with a considerable number of computing components. As a result, the computational software may function in a deficient manner in that the software operates too slowly resulting from inefficiencies in accessing each of the multiple data sources resulting from the geographic distribution of the data sources.

Computational software used in pulling together and/or processing data from multiple data sources found within a computing environment may also encounter technical challenges in processing the data in addition to or instead of retrieving the data from the multiple data sources. Such technical challenges can result because the data, being provided through multiple data sources via a plurality of hardware components in a plurality of different geographic locations, is stored in a variety of formats that are not compatible for use by the computational software. For example, the computational software may require certain data to be provided as a numerical value. However, a first data source from which the data is retrieved may store the data as text, a second data source from which the data is retrieved may store the data as an alphanumeric, and so forth. In other aspects, the data may be stored in various languages. This can pose a technical challenge in that the computational software is then required to have functionality to track and convert the data provided in the different formats from the different data sources.

An additional technical challenge is that the computational software may need to access data from a plurality of sources that are not readily identifiable by the computational software. Thus, a lack of a comprehensive understanding of the data needed from the multiple data sources may not always be known with respect to where and how the data is stored in the multiple data sources. For example, computing systems that implement, execute, manage, and/or the like the computational software used in processing the data may not appreciate and/or understand where and how the data is stored in the multiple data sources. As a result, the computational software may be processing a set of data that may not be comprehensive and therefore, the results (e.g., output) of the computational software may be inaccurate.

As a specific example demonstrating these technical challenges, many entities, such as corporations, have begun to use computational software for providing data responsive to respective queries, where each query requires a distinctive technique for accessing the data, where the data is stored using tools that are incompatible with one another (e.g., such that accessing the data is not possible with a particular set of tools) due to the nature of the data, and the like. Additionally, software tools that may provide integration amongst these tools may risk exposing sensitive data unnecessarily. Such software tools may still fail to provide comprehensive responsiveness where the data is stored across a plurality of storage locations in a plurality of different geographic locations (e.g., having a plurality of different storage conditions)

As a specific example demonstrating these technical challenges, many entities, such as corporations, have begun to use computational software for reporting data on social responsibilities. Such computational software may involve collecting and reporting on data involving environmental, social, and (corporate) governance (ESG). ESG is an approach to the extent to which an entity works to achieve social goals that go beyond maximizing profits on behalf of shareholders.

Accordingly, an entity may utilize computational software in generating reports on various ESG metrics that are used in assessing the entity's exposure to a range of ESG risks (e.g., in conducting an investment analysis). For example, the computational software may generate one or more reports for the entity on ESG metrics such as the level of greenhouse gas emissions the entity is producing and/or the number of health and safety incidents that occur over a time period such as a year for the entity. In addition, an entity may use computational software to gather and report ESG metrics needed in quantifying the entity's effects of certain climate-related events and transaction activities. Such computational software has become important as agencies have proposed rules to enhance and standardize disclosures made by entities with respect to their climate-related risks, their efforts and goals for climate-related targets, their overseeing (e.g., management) of their climate-related risks, and/or the like.

However, many entities can encounter considerable technical difficulties in generating reports that involve different ESG metrics. This is because the entity may use computational software in reporting on the different ESG metrics that cover a wide range of different measures and/or are stored over a multitude of data sources. As a result, the computational software may encounter many of the technical challenges as described above. For example, a first measure may be an amount of pollution being created by a particular production facility for the entity. A second measure may be the level of diversity seen in the workforce for the entity. A third measure may be the number of safety incidents that have occurred at a research lab facility for the entity. The data for these three measures may involve different formats and may be found in data sources that are spread over multiple computing systems of a computing environment (e.g., a first computing system found within the production facility, a second computing system used by the human resources department for the entity, and a third computing system found within the research lab facility).

Therefore, computational software used in generating reports that involve gathering and processing these three ESG metrics can encounter technical challenges in that the computational software can encounter compatibility issues with computational software used for collecting and tracking the three ESG metrics for the first, second, and/or third computing systems. The computational software can encounter compatibility issues with hardware components found within the first, second, and/or third computing systems. The computational software can encounter difficulties with the access and/or management controls used for the data sources found in the first, second, and/or third computing systems. The computational software can encounter performance issues as a result of the first, second, and/or third computing systems being spread over a considerable distance and/or involving a considerable number of hardware components. The computational software can encounter compatibility issues with formats in which the three ESG metrics are provided, and/or can encounter comprehensive processing issues due to a lack of understanding of where and how the three ESG metrics are stored in the data sources for the first, second, and/or third computing systems. Additionally, the computational software can encounter technical challenges in that accessing any individual metric with respect to the set of metrics may have an accessibility method so distinct form the remaining metrics that accessing the individual metric may be sufficiently divorced from the remaining metric in the set of metrics that the system may be unable to directly access it. Additionally, computational software and other software tools designed to address these problems may risk exposing potentially sensitive data unnecessarily. Conventional techniques for gathering and processing the metrics discussed herein are cumbersome, increase the risk that potentially relevant data may not be integrated due to compatibility issues or an inability to identify a manner in which the data can be accessed, limit control over data types and formats, etc.

Various aspects of the present disclosure overcome many of the technical challenges associated with accessing, retrieving, and processing data stored within data sources located on multiple computing systems as discussed herein. Specifically, various aspects are directed to a computer-implemented data retrieval process for using a novel data construct referred to as a delegate for accessing and processing different data units for the data along with individual computing systems (e.g., assignees) responsible for retrieving the data units from the multiple computing systems. Accordingly, a data retrieval computing system may be provided to execute the data retrieval process. In some aspects, the data retrieval computing system can execute the data retrieval process by receiving a set of delegates. Delegates are data objects that represent data units stored within computing systems that identify assignees (e.g., computing systems having assigned user accounts with permission to access the data units).

For example, the data retrieval computing system may provide a data retrieval service (e.g., Software as a Service) that is accessible over a network by remote computing devices. Here, the data retrieval computing system may provide one or more graphical user interfaces (e.g., webpages) through the data retrieval service. Therefore, the remote computing devices may access the graphical user interfaces to identify the data units that are to be retrieved from the different computing systems. As a specific example, the data units may involve different ESG metrics that the entity is retrieving for reporting purposes and/or some other purposes. The data retrieval computing system may provide one or more graphical user interfaces through the data retrieval service that displays a listing of different ESG metrics, and the personnel, via the one or more graphical user interfaces on the remote computing devices, selects the desired metrics from the listing.

In addition, the personnel may identify other systems from which the one or more of the selected ESG metrics are accessible. Here, particular systems may require a particular set of credentials in order to access the metrics. As such, the data retrieval computing system may identify particular user accounts with permissions (e.g., credentials) to gain access to data sources used in storing the data for the ESG metrics found within the corresponding computing systems. In addition, the data retrieval computing system may identify assignees that have an understanding of where and how the data for the ESG metrics are stored within the corresponding computing systems. Therefore, in the example, a delegate serves as a data construct identifying one or more corresponding data units that are ESG metrics and a corresponding assignee who has access to a corresponding computing system to retrieve the corresponding data units.

In various aspects, the data retrieval computing system generates a corresponding graphical user interface for each delegate from the set of delegates. For example, the corresponding graphical user interface may be configured with a display element that provides a request for a corresponding data unit (e.g., the data unit identified as being accessible by each delegate). In addition, the corresponding graphical user interface may be configured with an input element for receiving the corresponding data unit. As a specific example, the corresponding graphical user interface may be configured with a display element that requests "Please provide the entity's yearly carbon emissions in tonnes (metric tons) at XYZ location" along with an input element that allows the corresponding assignee to type in the entity's yearly carbon emissions for the location. Thus, in some aspects, the data retrieval computing system can generate a customized graphical user interface for each of the delegates.

In addition to the corresponding graphical user interface, the data retrieval computing system in various aspects generates at least one corresponding delegate record for each delegate of the set of delegates. For example, one or more corresponding delegate records generated for the delegate may identify one or more corresponding data units and the corresponding graphical user interface for the delegate. In particular aspects, the corresponding delegate records for the set of delegates are stored in a centralized repository. For example, the data retrieval computing system may include the centralized repository. Here, the repository may be referred to as "centralized" in the sense that the repository is used in storing the data units for the set of delegates in a centralized location with respect to the locations of the different computing systems from which the data units were retrieved. Therefore, the centralized repository can address various technical challenges of having to retrieve the data units from the different computing systems each time the entity needs the data units in performing an activity, process, enterprise, and/or the like.

In various aspects, the data retrieval computing system generates a corresponding electronic communication for each delegate of the set of delegates. For example, the corresponding electronic communication can be an email, a text message, a message via a messaging application, and/or the like. In some aspects, the corresponding electronic communication includes a link to access the corresponding graphical user interface.

The data retrieval computing system then sends the corresponding electronic communication for each delegate to the corresponding assignee. Upon receipt of the corresponding electronic communication, the corresponding assignee can activate the link in the communication to access the corresponding graphical user interface. For example, the corresponding graphical user interface may be a webform provided through the data retrieval service. Therefore, the assignee may activate the link and as a result, the data retrieval computing system provides the corresponding webform that is loaded into a browser application residing on a computing device being used by the assignee to provide the assignee with access to the webform. Once the assignee has provided the corresponding data unit via the webform, the data retrieval computing system receives the corresponding data unit for the particular delegate and records the corresponding data unit for the particular delegate in at least one corresponding delegate record for the particular delegate.

At this point, the data retrieval computing system can assist in facilitating various actions (e.g., activities, processes, enterprises, and/or the like) being performed using the retrieved data units for the set of delegates. For example, the data retrieval computing system may assist in generating reports based on one or more of the retrieved data units. Here, the data retrieval computing system may access one or more of the data units from the corresponding delegate record(s) and generate a report based on each of the data units or in the alterative, the data retrieval computing system may provide the data unit(s) to separate computational software to generate the report. Accordingly, the retrieval computing system and/or computational software may provide, for example, a hard copy version of the report for printing and/or an electronic version of the report for display on a graphical user interface.

In another example, the data retrieval computing system may access one or more of the data units from the corresponding delegate record(s) and submit the data units to a third-party computing system. As a specific example, the data units may have been retrieved for different ESG metrics and the data retrieval computing system may submit the data units on behalf of an entity to a third-party computing system for an ESG rating agency such as Sustainalytics ESG Risk Ratings, MSCI ESG Ratings, Bloomberg ESG Disclosures Scores, etc. In turn, the ESG rating agency can then use the submitted data units in generating a ESG rating (e.g., score) for the entity.

In yet another example, the data retrieval computing system may access one or more of the data units from the corresponding delegate record(s) and use the data units in conducting an analysis on the data units (or provide the data units to separate computational software for conducting the analysis). As a specific example, again, the data units may have been retrieved for different ESG metrics and the data retrieval computing system may use the data units in conducting an analysis in identifying any gaps in the entity meeting requirements set for the ESG metrics and/or any ESG metrics the entity is underperforming and/or over performing on with respect to peer entities.

The data retrieval computing system in various aspects provides significant improvements in data retrieval functionality. For instance, the data retrieval computing system can use the set of delegates in generating delegates records for the different delegates, as well as generating graphical user interfaces for the different delegates to retrieve the corresponding data units. In some aspects, the data retrieval computing system can use the set of delegates in addressing the technical challenges involved with collecting and processing the data units from multiple computing systems as detailed herein. For instance, the data retrieval computing system can address the technical challenges encountered with compatibility issues with computational software used for collecting and tracking the data units for the multiple computing systems and/or the different hardware components found within the multiple computing systems in that the set of delegates can facilitate the collection of the data units independent of the computational software and/or hardware components. The data retrieval computing system can address the technical challenges encountered involving difficulties with access and/or management controls used for the data sources found in the multiple computing systems in that the set of delegates can be used in collecting the data units through electronic communications and graphical user interfaces independent of the access and/or management controls. The data retrieval computing system can address the technical challenges encountered with respect to performance issues resulting from the multiple computing systems being spread over a considerable distance and/or involving a considerable number of hardware components in that the set of delegates, electronic communications, and graphical user interfaces can be used in collecting the data units in a manner independent of and unaffected by the distance of the multiple computing systems and/or the number of hardware components involved. The data retrieval computing system can address the technical challenges encountered with compatibility issues with formats in which the different data units are found within the multiple computing systems in that the set of delegates can be used in defining the format in which the different data units should be provided from the multiple computing systems. Finally, the data retrieval computing system can address the technical challenges encountered that are related to comprehensive processing issues due to a lack of understanding of where and how the data units are stored in the multiple computing systems in that the set of delegates facilitate the collection of the data units through assignees who have an understanding of where and how the data units are stored in the multiple computing systems. In additional or alternative aspects, the data retrieval computing system in various aspects can use the set of delegates in addressing the technical challenges involved with providing a centralized source of the data units that originate from multiple computing systems in that the set of delegates can be used in collecting the data units in a manner that involves storing the collected data units in a centralized repository.

The remainder of disclosure is discussed in terms of the data units being associated with ESG metrics that entities may be retrieving for various purposes. However, in various aspects, the data retrieval process described herein can be used in accessing, retrieving, and processing data units for other types of data stored within data sources located on multiple computing systems. For example, the data retrieval process described herein can be used in accessing, retrieving, and processing data units for financial measures, manufacturing benchmarks, production outputs, research results and/or findings, and/or the like. The term "data unit" can be considered a portion of data defined within a set/group of data. For example, a data unit may be one or more particular metrics, measures, benchmarks, outputs, results, findings, and/or the like in a set/group of metrics, measures, benchmarks, results, findings, and/or the like. Further detail is now provided on various aspects.

Example Computing Environment

FIG. 1 depicts an example of a computing environment that can be used for accessing, retrieving, and processing data units stored within data sources located on multiple computing systems according to various aspects. For example, entities (e.g., organizations) may be interested in retrieving data units for various collections of ESG metrics to be used for reporting purposes. For any particular entity, the data units for the various ESG metrics found in a particular collection of ESG metrics may be stored in data sources found within a plurality of computing systems for the entity. Personnel for the entity (e.g., an individual such as an ESG officer) may be responsible for accessing, retrieving, and processing the data units for the different ESG metrics so that the data units can then be used in generating the appropriate reports.

In various aspects, a data retrieval computing system 100 is provided within the computing environment that includes software components and/or hardware components to assist entities (e.g., personnel thereof) in accessing, retrieving, and processing data units stored within data sources located on multiple computing systems. For instance, the data retrieval computing system 100 may provide a data retrieval service that is accessible over one or more networks 150 (e.g., the Internet) by an entity (e.g., a tenant computing system 160 associated with the entity or "tenant" of the data retrieval service).

Here, the data retrieval computing system 100 may provide personnel of the entity such as the ESG officer with one or more graphical user interfaces (e.g., webpages) through the service to access the data retrieval computing system 100. The ESG officer may use the service in performing functionality associated with accessing, retrieving, and processing data units for various ESG metrics stored within data sources located on multiple computing systems for the entity. As discussed in more detail herein, the data retrieval computing system 100 may facilitate the ESG officer identifying the collection of ESG metrics of interest via one or more of the graphical user interfaces provided through the data retrieval service. For example, the data retrieval computing system 100 may provide the ESG officer with a graphical user interface displaying a listing of the ESG metrics. In some instances, the ESG metrics may be organized into groupings according to a defined set of rules. Therefore, the ESG officer can select the individual ESG metrics that are of interest to the entity and/or a grouping of ESG metrics that are of interest to the entity.

In addition, the data retrieval computing system 100 may facilitate the ESG officer providing information on personnel (e.g., individuals) who have access to the plurality of computing systems and can provide the data units for the different ESG metrics found in the collection of ESG metrics. Here, for example, the data retrieval computing system 100 may provide the ESG officer with a graphical user interface through which the ESG officer can provide contact information for the different personnel such as email addresses, telephone numbers, message application user identifiers, and/or the like that can be used in contacting the different personnel.

Further, the data retrieval computing system 100 can provide the ESG officer with one or more graphical user interfaces that the ESG officer can use in defining a set of delegates for the collection of ESG metrics and different personnel. As previously noted, in various aspects, a delegate comprises a novel data construct used in storing different data units, such as ESG metrics, along with assignees, such as personnel responsible for retrieving the data units for the ESG metrics from the plurality of computing systems.

In some instances, the data retrieval computing system 100 may include a repository 140 that can be used for storing the collected data units for the collection of ESG metrics. The repository 140 can be viewed as "centralized" in that the repository 140 can be used in storing data units for the collection of ESG metrics that have been retrieved from different computing systems for the entity that may be spread over various locations and/or may be separate, independent, and/or the like from each other. Therefore, the repository 140 can serve as a common source of data for the ESG metrics that can then be used in performing some activity, process, enterprises, and/or the like.

In some aspects, the data retrieval computing system 100 executes a delegate module 110 to facilitate the generation of data records and graphical user interfaces for the set of delegates defined by the ESG officer. The delegate module 110 generates a delegate record set defined by a set of rules defined by the ESG officer. The delegate record set can include one or more data records for each delegate defined in the set of the delegates. The delegate record set for a delegate may identify the corresponding ESG metrics for the delegate, as well as the assignee responsible for retrieving the data units for the corresponding ESG metrics. In addition, the delegate record set may identify the graphical user interface used in retrieving the data units for the corresponding ESG metrics.

In additional or alternative aspects, the data retrieval computing system 100 executes a metric data module 115. The metric data module 115 provides a graphical user interface to collect the data units for an ESG metrics set. The ESG metrics set can include one or more corresponding ESG metrics defined for a delegate. In an example, the data retrieval computing system 100 sends an electronic communication to the assignee who is responsible for retrieving the data units for the ESG metrics set. The electronic communication can include a link that is configured for accessing the graphical user interface that requests the data units for the ESG metrics set. Accordingly, the data retrieval computing system 100 executes the metric data module 115 to receive the data units and store the data units in the repository 140.

In additional or alternative aspects, the data retrieval computing system 100 executes an additional data module 120 to solicit further data for the ESG metrics set defined for a delegate. Such data may be required following a review by an ESG officer of the data units collected for the ESG metrics set. For instance, if the data retrieval computing system 100 receives input (e.g., from the ESG officer) that additional data is needed for the ESG metrics set, the additional data module 120 performs one or more operations to solicit the additional data from the corresponding assignee for the delegate.

In additional or alternative aspects, the data retrieval computing system 100 executes a tenant module 125 to manage the set of delegates and corresponding ESG metrics for the particular entity. The tenant module 125 can perform various actions for the entity (e.g., tenant) with respect to the data units retrieved for the ESG metrics. In various aspects, the tenant module 125 can manage the workflow performed for retrieving the data units for the ESG metrics found in the different delegates, as well as the workflows performed for the individual delegates, such as generating one or more reports based on the data units retrieved for the collection of ESG metrics, submitting one or more of the data units to independent computational software for the entity and/or a third-party computing system 170 on behalf of the entity, or use one or more of the data units retrieved for the collection of ESG metrics in conducting an analysis. In one example, the data retrieval computing system 100 may submit the data units for the collection of the ESG metrics to a third-party computing system 170 for an ESG rating agency, and receive an ESG rating (e.g., score) for the entity as a response from the third-party computing system 170. In another example, the data retrieval computing system 100 may identify gaps in the entity meeting requirements defined for the ESG metrics and/or any ESG metrics the entity is underperforming and/or over performing on with respect to peer entities. In some aspects, the data retrieval computing system 100 may use computational tools such as machine-learning models in performing this analysis. In yet another example, the data retrieval computing system 100 may access a tenant computing system 160 of the entity and have some action performed based on one or more of the data units retrieved for the collection of ESG metrics such as, for example, adjusting the settings of production machinery to influence the consumption of fuel by the machinery.

Delegate Module

The delegate module 110 is discussed in the context of retrieving data units for a collection of data metrics across a plurality of potentially incompatible computing systems. For example, the delegate module 110 may be used to retrieve metrics of a particular type (e.g., ESG metrics), which may, for example, be stored in distinct computing systems having distinct access requirements in distinct formats such that conventional computing systems are not designed to interface with, access, or retrieve data from each of the distinct systems. Additionally, the delegate module 110 can be used in retrieving data units for other types of data in addition to, or instead of, ESG metrics. Here, the data retrieval computing system 100 may provide a website or other online portal that is accessible by user accounts with certain permissions. For instance, a user account may be associated with an "ESG officer" role having certain permissions that allow access to various functions, within the data retrieval service provided by the data retrieval computing system 100, associated with being the "owner" and/or "approver" of the ESG metrics for the entity. For instance, these functions can include accessing, retrieving, and processing the data units for the collection of ESG metrics that are of interest to the entity.

Accordingly, the data retrieval computing system 100 may provide one or more graphical user interfaces in the form of webpages or other online portals through which the ESG officer ort other user can identify the ESG metrics of interest and for which data units are found (e.g., stored on data sources found) within multiple computing systems for the entity. For example, the data retrieval computing system 100 may provide a graphical user interface that provides a listing of ESG metrics along with some type of selection mechanism for the different ESG metrics to allow the ESG officer to select the collection of ESG metrics that are of interest to the entity. In some aspects, the data retrieval computing system 100 can configure the graphical user interface to arrange ESG metrics into groups and/or sets and present options for selecting one or more appropriate groups of ESG metrics that are applicable to the entity (e.g., by configuring the graphical user interface to include a plurality of user-selectable elements for each ESG metric or group of ESG metrics). The data retrieval computing system 100 may configure the graphical user interface to include or exclude particular groups of ESG metrics within the user interface according to a set of rules defined by a user or other suitable set of rules (e.g., according to a set of rules defined by a particular query for a particular set of data). The data retrieval computing system 100 may, for example, identify a set of metrics that include metrics associated with the query (e.g., identified as potentially containing data relevant to the query). The data retrieval computing system 100 may then configure the graphical user interface to include the identified metrics for selection, and exclude a second set of metrics that were not identified as relevant to the query.

In addition, the data retrieval computing system 100 may provide one or more graphical user interfaces (e.g., webpages) that allow for the ESG officer to identify other personnel who may have access to the multiple computing systems and can retrieve the data units for the collection of ESG metrics. For example, the ESG officer may be interested in retrieving data units on the yearly carbon emissions produced by a manufacturing facility for the entity. Here, the ESG officer may be interested in soliciting the plant manager for the facility in providing the data units for the year's carbon emissions. Therefore, the data retrieval computing system 100 may generate, configure, and provide a graphical user interface through which the ESG officer can identify the plant manager. In addition, the data retrieval computing system 100 may generate and provide a graphical user interface through which the ESG officer can provide contact information for the plant manager such as an email address, telephone number, user identifier for a message application, and/or the like. In turn, the data retrieval computing system 100 may record the information provided for the different personnel in the repository 140.

Figure 2:
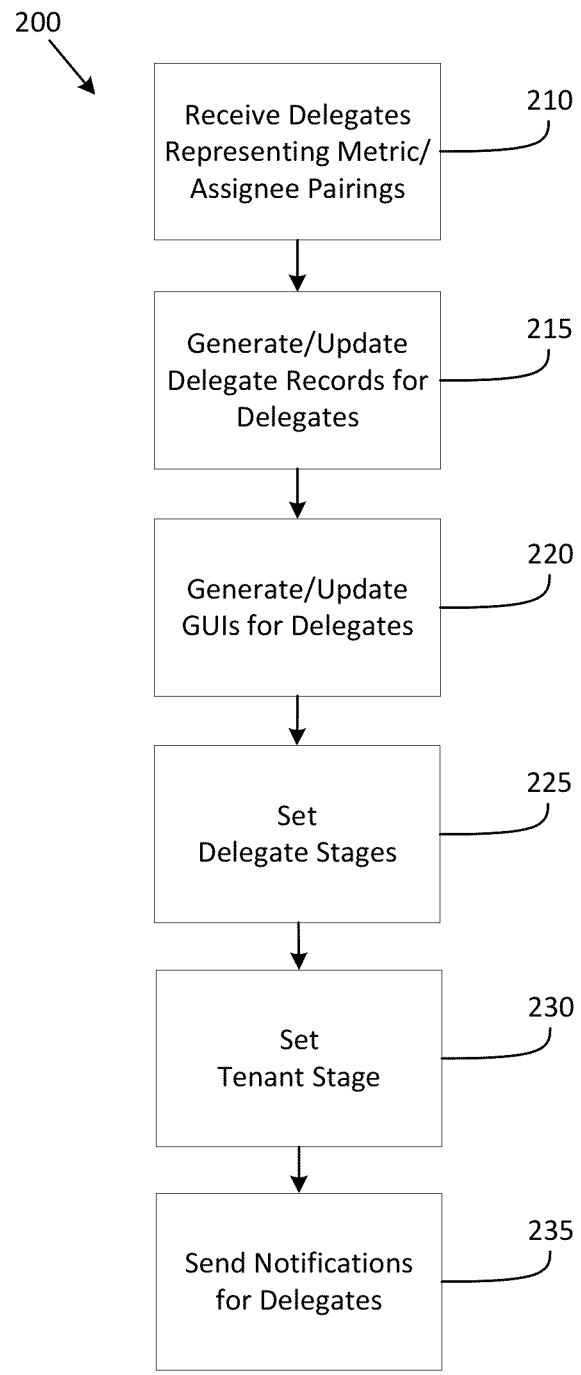
FIG. 2 depicts an example of a process for processing a set of delegates in accordance with various aspects of the present disclosure.

Turning now to FIG. 2, additional details are provided regarding a delegate module 110 used for processing a set of delegates for an entity in accordance with various aspects. Accordingly, the flow diagram shown in FIG. 2 may correspond to operations executed, for example, by computing hardware found in the data retrieval computing system 100 as described herein, as the computing hardware executes the delegate module 110.

The process 200 involves the delegate module 110 receiving the set of delegates that includes the ESG metric(s)/assignee pairings in Operation 210. For instance, the data retrieval computing system 100 may provide one or more graphical user interfaces (e.g., webpages) to allow the ESG officer to define delegates with respect to the collection of ESG metrics selected by the ESG officer. The data retrieval computing system 100 receives, via one or more graphical user interfaces provided to a computing device, input defining a set of delegates for the collection of ESG metrics that have been selected by the ESG officer. In this example, a delegate is a data construct representing an ESG metrics set that includes one or more ESG metrics that are assigned to one or more assignees, such as particular personnel responsible for retrieving the data units for the ESG metrics set. A delegate can facilitate various functionality within the data retrieval computing system 100 with respect to retrieving, storing, and managing the data units for the collection of ESG metrics. Each delegate defines one or more of the ESG metrics from the collection of ESG metrics along with an assignee who is responsible for providing the data units for the one or more ESG metrics.

In some aspects, the delegate module 110 provides, in a graphical user interface, options for defining multiple delegates that include a particular ESG metric. For example, the data retrieval computing system 100 may need to access and retrieve carbon emissions data for different plants being operated by the entity at different locations. Different computing systems operating at each of the locations and operated by different personal may be responsible for providing the data units for carbon emissions for the different plants. Therefore, the delegate module 110 provides, via a generated user interface, options that allow the ESG officer to define a delegate for each plant at the different locations that includes the carbon emissions ESG metrics and the appropriate personnel working at the location who is responsible for providing the data units for the carbon emissions.

The delegate module 110 generates and/or updates one or more delegate records for each of the delegates in Operation 215. For example, the delegate module 110 provides, in a graphical user interface, options for defining the different delegates for the collection of ESG metrics for the first time for the entity. Therefore, the delegate module 110 may generate one or more delegate records for each of the delegates and store the delegate records in the repository 140.

In other instances, the delegate module 110 provides, in a graphical user interface, options for updating one or more of the delegates of the set of delegates that were previously defined. For example, a delegate may have been previously defined for a particular ESG metric that was assigned to a plant manager. However, the plant manager may have been promoted to a new position and is no longer the individual who is responsible for providing the data unit for the ESG metric. Therefore, the delegate module 110 may provide, in a graphical user interface, an option for the ESG officer to updated the delegate to reflect a new individual (e.g., a new assignee) who is now responsible for providing the data unit for the particular ESG metric via a computer system that the delegate is authorized to access (e.g., by virtue of holding particular access credentials). Accordingly, the delegate module 110 may query the repository 140 to determine whether an appropriate delegate record already exists for the delegate. If so, then the delegate module 110 may update the corresponding delegate record to reflect the update provided by the ESG officer for the delegate.

In Operation 220, the delegate module 110 generates and/or updates the graphical user interfaces for the different delegates. The delegates can facilitate various functionality involving the generation of customized graphical user interfaces (e.g., webforms) that can be used by assignees in providing the data units for the collection of ESG metrics. In Operation 220, the delegate module 110 can create and/or update a graphical user interface for a delegate that is customized to one or more ESG metrics that have been defined for the delegate. Here, the graphical user interfaces can be "customized" in the sense that the data retrieval computing system 100 (e.g., the delegate module 110) can generate a graphical user interface for each delegate that is configured to solicit the data units for ESG metrics set defined for the delegate.

In some aspects, each ESG metric may be associated with a request (e.g., a request statement) that is designed to solicit the needed data unit for the ESG metric. For example, the ESG metric may involve the number of females who hold a senior level management position with the entity. In this example, the request may be "Please provide the number of females who currently hold a senior level management position at XYZ location for the company." Accordingly, the requests for the different ESG metrics may be stored in the repository 140 and the delegate module 110 may retrieve the appropriate request from the repository 140 for any particular ESG metric.

In addition, the delegate module 110 may include functions for editing and/or customizing the request for a particular delegate. For instance, in the example, the delegate module 110 may fill in the location associated with the particular delegate (e.g., "Please provide the number of females who currently hold a senior level management position at the Atlanta office for the company.").

In various aspects, the delegate module 110 generates and/or updates a graphical user interface for a particular delegate by providing a display element for the request associated with a particular ESG metric defined by the delegate. In the example, above, the delegate module 110 generates and/or updates the graphical user interface to be configured with a display element that displays the request "Please provide the number of females who currently hold a senior level management position at XYZ location for the company." In addition, the delegate module 110 generates and/or updates the graphical user interface to be configured with an input element that allows for the assignee to enter the data unit for the corresponding ESG metric on the graphical user interface. For example, the input element may entail a freeform field or a selection field that provides the assignee with options for selecting as the data unit. In some aspects, the input element may be formatted to receive a certain form and/or type of data unit such as text, numeric, percentage, and/or the like.

At Operation 225, the delegate module 110 sets a delegate stage for each delegate of the set of delegates. For example, the data retrieval computing system 100 may provide an entity with various delegate workflows that can be assigned to the delegates for the entity. The delegate workflows may define different stages in which a delegate may be involved in during the retrieval of data units for the one or more ESG metrics defined for the delegate.

In one example, the data retrieval computing system 100 may provide the entity with an option for a delegate workflow that involves the stages of "In Retrieval," "In Review," and "Approved." A delegate at the "In Retrieval" stage is at a point in the delegate workflow where the assignee for the delegate has been solicited to provide the data units for the one or more ESG metrics defined for the delegate. A delegate at the "In Review" stage is at a point in the delegate workflow where the ESG officer (e.g., "owner" and/or "approver") is reviewing the data units returned by the assignee for the one or more ESG metrics defined for the delegate. A delegate at the "Approved" stage is at a point in the delegate workflow where the ESG officer has approved the data units returned by the assignee for the one or more ESG metrics defined for the delegate.

Continuing with this example, the delegate module 110 may set the delegate stage for each delegate to "In Retrieval" to indicate that the corresponding assignee for the delegate has been solicited to provide the data units for the ESG metrics set defined for the delegate. In some aspects, the delegate module 110 performs this operation by updating the corresponding delegate record for the delegate in the repository 140 to reflect the current delegate stage. Accordingly, the data retrieval computing system 100 may provide delegate workflows containing other stages and/or allow for an entity (e.g., ESG officer) to define a customized delegate workflow for the entity along with rules (e.g., trigger events) for placing a delegate into a particular stage of the delegate workflow.

Assigning a delegate workflow to the various delegates can allow for the ESG officer in various aspects to quickly assess the progress of retrieving the data units for the one or more ESG metrics defined for the different delegates. In addition, assigning a delegate workflow to the various delegates can allow for the data retrieval computing system 100 to perform certain actions (e.g., functionality) automatically in response to a delegate being in a particular stage and/or a triggering condition or event occurring. In the example above, the data retrieval computing system 100 can generate and send a reminder notification (e.g., electronic communication) to an assignee as a result of a corresponding delegate being in the "In Retrieval" stage for a set amount of time (e.g., thirty days) without receiving the data units for the corresponding one or more ESG metrics.

In Operation 230, the delegate module 110 sets a tenant stage for the entity's collection of ESG metrics. To do so, the data retrieval computing system 100 may provide an entity with various tenant workflows that can be assigned to the collection of ESG metrics that are being collected, stored, and/or managed for the entity. The tenant workflows may define different stages in which an entity (e.g., tenant) may be involved during the retrieval of data units for the collection of ESG metrics being retrieved, stored, and/or managed for the entity.

In one example, the data retrieval computing system 100 may provide the entity with an option for a tenant workflow that involves the stages of "Launched," "In Review," and "Completed." Accordingly, the entity's collection of ESG metrics at the "Launched" stage is at a point in the tenant workflow where the set of delegates have been defined for the collection of ESG metrics being collected for the entity and the assignees for the different delegates have been solicited to provide the data units for the collection of ESG metrics. The entity's collection of ESG metrics at the "In Review" stage is at a point in the tenant workflow where the data units for the collection of ESG metrics have been collected and at least some of the data units still need to be reviewed by the ESG officer (e.g., the "owner" and/or "approver"). The entity's collection of ESG metrics at the "Completed" stage is at a point in the tenant workflow where all of the data units for the collection of ESG metrics have been reviewed and approved by the ESG officer. Therefore, the delegate module 110 may set the tenant stage for the entity's collection of ESG metrics to "Launched" to indicate that the assignees for the different delegates found in the set of delegates have been solicited to provide the data units for the collection of ESG metrics. In some aspects, the delegate module 110 performs this operation by updating a tenant record for the entity in the repository 140 to reflect the current tenant stage.

Similar to the delegate workflows, the data retrieval computing system 100 may provide tenant workflows containing other stages and/or allow for an entity (e.g., ESG officer) to define a customized tenant workflow for the entity along with rules (e.g., trigger events) for placing the entity's collection of ESG metrics into a particular stage of the tenant workflow. Assigning a tenant workflow to the collection of ESG metrics can allow for the ESG officer in various aspects to quickly assess the progress of retrieving, storing, and/or managing the data units for the entity's collection of ESG metrics. In addition, assigning a tenant workflow to the collection of ESG metrics can allow for the data retrieval computing system 100 to perform certain actions automatically in response to a collection of ESG metrics being in a particular stage and/or a triggering condition or event occurring. For example, the data retrieval computing system 100 can submit the data units retrieved for one or more of ESG metrics to a third-party computing system 170 on behalf of the entity in response to the collection of ESG metrics being in the "Completed" stage.

At Operation 235, the delegate module 110 sends notifications to the assignees for the different delegates found in the set of delegates. The notifications in various aspects may entail different forms of electronic communications such as emails, text messages, messages via messaging applications, and/or the like. In some aspects, the delegate module 110 generates each of the notifications to include a link configured to access the corresponding graphical user interface for the delegate. Accordingly, the delegate module 110 can facilitate the assignee in being able to identify a preference for a type of electronic communication to be used in receiving the notification.

Upon receipt of a notification, the retrieval computing system 100 provides an assignee with access to the corresponding graphical user interface upon the assignee activating the link provided in the notification. For example, the delegate module 110 may have generated each of the graphical user interfaces as a webform. Therefore, responsive to the assignee activating the link, the data retrieval computing system 100 may provide the webform to the assignee's computing device, which may then be loaded into a browser application executing on the device. The data retrieval computing system 100 may then receive the data units defined for the delegate as a result of the assignee providing the data units via the graphical user interface and submitting the data units accordingly.

Metric Data Module

Figure 3:
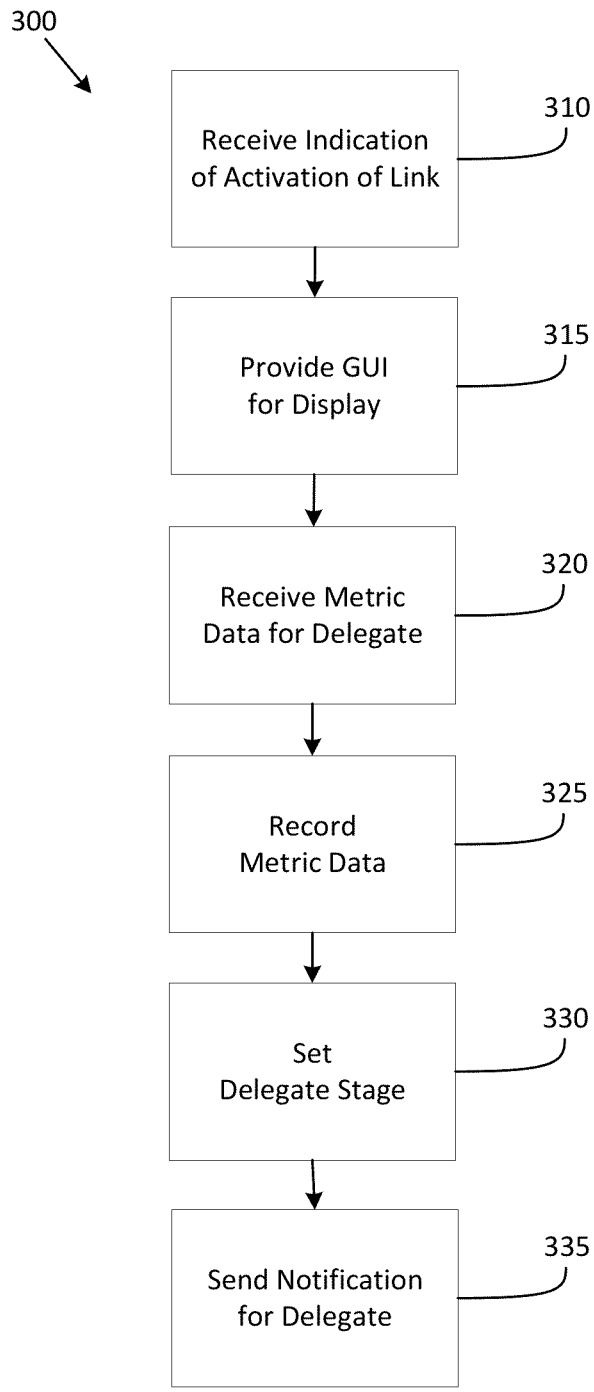
FIG. 3 depicts an example of a process for recording one or more data units for a delegate in accordance with various aspects of the present disclosure.

Turning now to FIG. 3, additional details are provided regarding a metric data module 115 used for recording metric data for a delegate in accordance with various aspects. Accordingly, the flow diagram shown in FIG. 3 may correspond to operations executed, for example, by computing hardware found in the data retrieval computing system 100 as described herein, as the computing hardware executes the metric data module 115.

As previously discussed, the data retrieval computing system 100 in various aspects sends a notification to an assignee to retrieve data units for one or more ESG metrics defined for a delegate. The notification can include a link that that the assignee can activate to access a graphical user interface to provide the data units for the one or more ESG metrics.

Therefore, upon the assignee activating the link, the process 300 involves the metric data module 115 receiving an indication of the activation of the link in Operation 310. For example, activation of the link in the notification may cause a request for the corresponding graphical user interface to be sent from the computing device being used by the assignee over a network 150 to the data retrieval computing system 100. In response, the data retrieval computing system 100 may execute the metric data module 115 and provide the data metric module with an indication that the link has been activated along with an identifier for the corresponding delegate and/or graphical user interface.

In Operation 315, the metric data module 115 retrieves the corresponding graphical user interface and provides the graphical user interface to the assignee. For example, the graphical user interface may comprise a webform. Therefore, the metric data module 115 may send the webform to the computing device being used by the assignee. In turn, the assignee's computing device may load the webform into a browser application executing on the computing device and the assignee may view the webform via the browser application.

The graphical user interface may be configured with one or more display elements that display requests (e.g., request statements) for data units for one or more ESG metrics that are defined by the corresponding delegate associated with the graphical user interface. For example, a display element may display a request such as "Please provide the yearly carbon emissions for your facility in tonnes (metric tons)." In addition, the graphical user interface may be configured with one or more input elements for receiving the data units for the one or more ESG metrics. Therefore, the assignee can provide the data units via the one or more input elements. Once the assignee has provided the data units, the data retrieval computing system 100 may receive a response from the graphical user interface that includes the data units for the one or more ESG metrics along with an identifier for the graphical user interface and/or corresponding delegate.

The data retrieval computing system 100 provides the data units to the metric data module 115. As a result, the metric data module 115 receives the data units for the delegate in Operation 320. The metric data module 115 then records the metric data for the delegate in the repository 140 in Operation 325. In addition, the metric data module 115 updates the stage for the delegate in Operation 330. For example, the metric data module 115 may set the stage for the delegate to "In Review." The metric data module 115 may perform this particular operation by updating a delegate record for the delegate in the repository 140.

In Operation 335, the metric data module 115 sends a notification to the approver (e.g., the ESG officer) indicating that the data units for the one or more ESG metrics defined for the delegate have been received from the assignee. For example, the metric data module 115 may send the notification in the form of an electronic communication such as an email, text message, message through a messaging application, and/or the like. As a result, the metric data module 115 provides the approver with the notification and the approver becomes aware that the data units for the one or more ESG metrics are available for review. The retrieval computing system 100 can then provide the approver access to the data retrieval service to review the data units.

Additional Data Module

Figure 4:
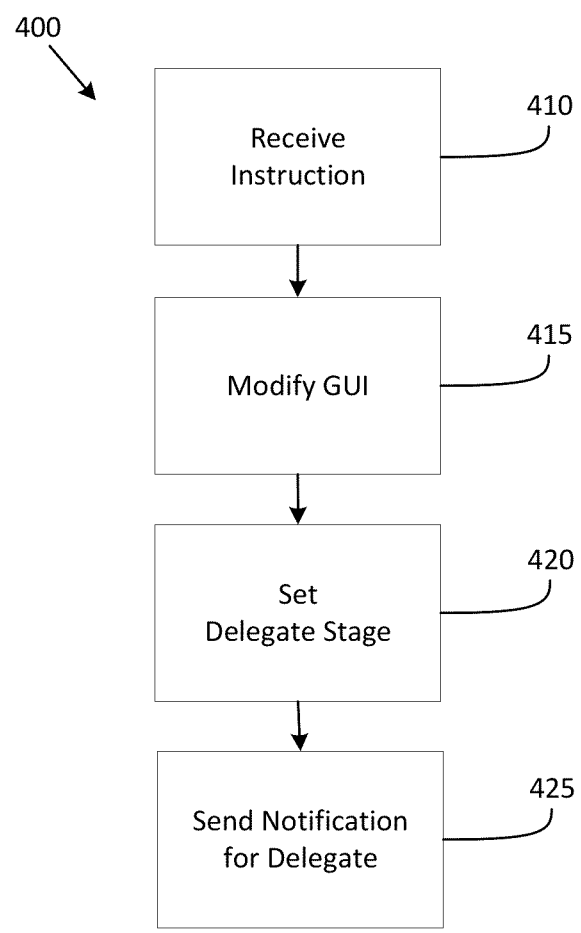
FIG. 4 depicts an example of a process for requesting additional data for a delegate in accordance with various aspects of the present disclosure.

Turning now to FIG. 4, additional details are provided regarding an additional data module 120 used for requesting additional data for a delegate in accordance with various aspects. Accordingly, the flow diagram shown in FIG. 4 may correspond to operations executed, for example, by computing hardware found in the data retrieval computing system 100 as described herein, as the computing hardware executes the additional data module 120.

As mentioned, in various aspects, the retrieval computing system 100 (e.g., the metric data module 115) provides the approver (e.g., ESG officer) with a notification when an assignee for a particular delegate has provided the data units requested for the one or more ESG metrics defined for the delegate. The retrieval computing system 100 may then provide the approver with access to the data retrieval service to review the data units provided by the assignee. Here, the data retrieval computing system 100 may generated and/or provide the approver with a graphical user interface that allows for the approver to access and review the data units provided by the assignee for the one or more ESG metrics defined for the delegate.

In some instances, the data retrieval computing system 100 may receive an indication that the approver has determined that the assignee has not provided the needed and/or correct data unit for one or more of the ESG metrics. In other instances, the data retrieval computing system 100 may receive an indication that the approver has determined that further data is needed for one or more of the ESG metrics such as supporting documentation for a particular data unit provided by the assignee. For example, the data retrieval computing system 100 may have provided the assignee with a graphical user interface requesting the number of female employees who are currently working at a particular facility. Here, the approver may determine that supporting documentation may be needed for the data unit provided by the assignee, and submit, to the data retrieval computing system 100, a request for the additional data. Therefore, the data retrieval computing system 100 may execute the additional data module 120 to generate additional graphical user interfaces to solicit the additional data needed for one or more of the ESG metrics.

Therefore, the process 400 involves the additional data module 120 receiving instructions with respect to the additional data needed for the one or more ESG metrics in Operation 410. For example, upon executing the additional data module 120, the data retrieval computing system 100 may provide, via a graphical user interface, the approver with a listing of requests that can be used in soliciting the additional data for the one or more ESG metrics. As a specific example, the listing of requests may include a request that indicates "Please provide updated data for the ESG metric in the correct format as originally requested." As another specific example, the listing of requests may include a request that indicates "Please provide supporting documentation to corroborate the data provided for this ESG metric." Therefore, the additional data module 120 receives instructions based on the appropriate requests selected by the approver for soliciting the additional data for the one or more ESG metrics. For example, the additional data module 120 may receive instructions to request updated data for the ESG metric in the correct format as originally requested. In another example, the additional data module 120 may receive instructions to request supporting documentation to corroborate the data provided for the ESG metric.

In Operation 415, the additional data module 120 modifies the corresponding graphical user interface for the delegate based on the instructions. For example, the additional data module 120 may modify the graphical user interface to include one or more display elements for displaying the request(s) for additional data selected by the approver. The additional data module 120 may also modify the graphical user interface to include one or more input elements to be used by the assignee in providing the additional data for the one or more ESG metrics. In addition, the additional data module 120 may modify the graphical user interface to display the original data units provided by the assignee for the one or more ESG metrics. The additional data module 120 may save the modified version of the graphical user interface. In some instances, the additional data module 120 may generate a new graphical user interface for the delegate to solicit the additional information instead of modifying the existing graphical user interface.

In Operation 420, the additional data module 120 sets the stage for the delegate. For example, the additional data module 120 may update the delegate stage for the delegate from "In Review" back to "In Retrieval" to indicate the delegate is at a point in the delegate workflow that data still needs to be collected from the assignee for the delegate. In addition, the additional data module 120 sends a notification to the assignee that additional data is being requested for the one or more ESG metrics in Operation 425. Again, the notification can be in the form of an electronic communication such as an email, text message, message via a messaging application, and/or the like. Further, the notification can include a link to facilitate the retrieval computing system 100 providing the assignee with access the modified graphical user interface upon receiving an indication of an activation of the link by the assignee.

Therefore, the data retrieval computing system 100 in various aspects can execute the metric data module 115 as previously discussed to display the modified graphical user interface to the assignee. The metric data module 115 can then receive the additional data for the one or more ESG metrics provided by the assignee via the modified graphical user interface and save the additional data for the delegate as previously discussed.

Tenant Module

Figure 5:
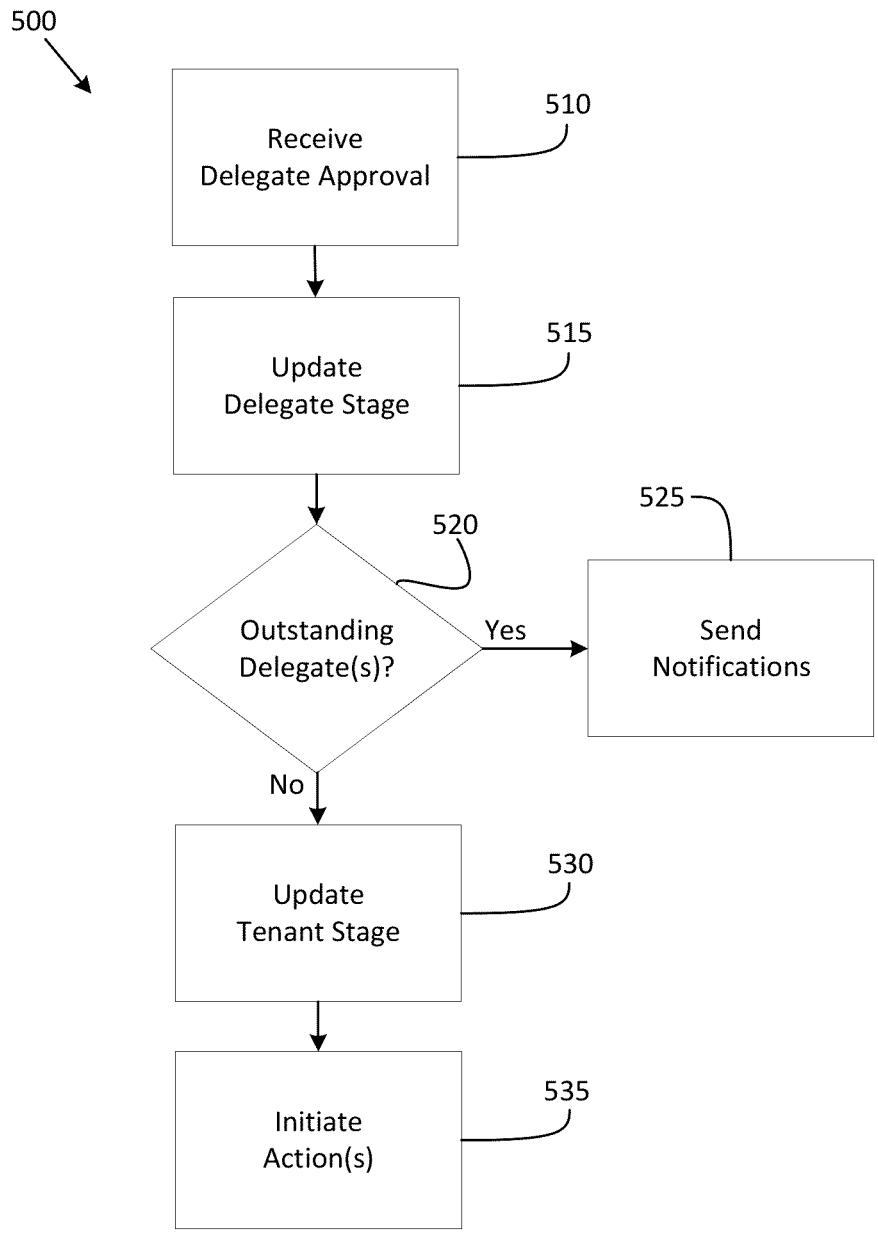
FIG. 5 depicts an example of a process for managing a tenant in accordance with various aspects of the present disclosure.

Turning now to FIG. 5, additional details are provided regarding a tenant module 125 used for managing an entity (e.g., tenant) in accordance with various aspects. Accordingly, the flow diagram shown in FIG. 5 may correspond to operations executed, for example, by computing hardware found in the data retrieval computing system 100 as described herein, as the computing hardware executes the tenant module 125.

The tenant module 125 in various aspects is used in managing the collection of ESG metrics selected for an entity (e.g., tenant) within the data retrieval service. As previously discussed, the retrieval computing system 100 can provide the approver (e.g., ESG officer) with a graphical user interface to review the data units submitted by an assignee for a particular delegate defined for the set of metrics. Based on the retrieval computing system 100 receiving an indication of the approver approving the data units that have been submitted, the data retrieval computing system 100 can execute the tenant module 125 to perform certain operations with respect to the approved data units and/or the collection of metrics selected for the entity.

Accordingly, the process 500 involves the tenant module 125 receiving the approval for the delegate in Operation 510. The tenant module 125 may also receive information along with the approval such as, for example, an identifier for the delegate. In Operation 515, the tenant module 125 updates the delegate stage for the delegate. For example, the tenant module 125 may update the delegate stage to "Approved." Here, the tenant module 125 may perform this particular operation by updating a corresponding delegate record for the delegate in the repository 140 to reflect the updated delegate stage.

The tenant module 125 determines whether the entity has any outstanding delegates for the collection of metrics selected for the entity in Operation 520. For example, the tenant module 125 may query the current delegate stage for each delegate of the set of delegates defined for the collection of metrics from the repository 140 to determine whether data units are still being retrieved for any of the delegates. If outstanding delegates remain for the entity, then the tenant module 125 in some aspects may determine whether any notifications should to be sent as follow ups with respect to retrieving the data units for one or more outstanding delegates and if so, send such follow-up notifications in Operation 525.

For example, the tenant module 125 may consider a deadline date that is identified for each of the outstanding delegates in the repository. If the tenant module 125 determines the deadline date for a particular outstanding delegate has passed and/or is within a time period threshold (e.g., is within the next five days), then the tenant module 125 may determine that a follow-up notification needs to be sent to the corresponding assignee for the outstanding delegate. In other instances, the tenant module 125 may consider, in addition to or instead of the deadline date, a different date such as a date the delegate stage for the delegate was set to "In Retrieval" and/or a date that the original notification for requesting the data units for the one or more ESG metrics defined for the outstanding delegate was sent to the corresponding assignee in determining whether a follow-up notification should be sent.

If instead the tenant module 125 determines the entity does not have any outstanding delegates, then the tenant module 125 may update the tenant stage for the collection of ESG metrics for the entity in Operation 530. For example, the tenant module 125 may update the tenant stage for the collection of ESG metrics to "Completed" in the repository 140 to reflect that the collection of ESG metrics are at a point in the tenant workflow where all of the data units for the collection of ESG metrics selected by the entity have been retrieved and approved. The tenant module 125 may also initiate one or more actions (e.g., activities, processes, enterprises, and/or the like) to be performed based on the retrieved data units for the collection of ESG metrics in Operation 535.

For example, the tenant module 125 may initiate the generation of one or more reports based on the retrieved data units for the collection of ESG metrics. The tenant module 125 (or some other module) may access one or more of the data units from the records found in the repository 140 for the corresponding delegates and generate a report based on the data units. In additional or alternative aspects, the tenant module 120 may provide the one or more data units to an independent computational software to generate the report. The tenant module 125 (or independent computational software) may provide, for example, a hard copy version of the report for printing and/or an electronic version of the report for display on a graphical user interface.

In another example, the tenant module 125 may initiate the submission of one or more of the data units for the collection of ESG metrics on behalf of the entity to a third-party computing system 170. The tenant module 125 (or some other module) may access one or more of the data units from the records found in the repository 140 for the corresponding delegates and submit the data units on behalf of the entity to the third-party computing system 170. For instance, the third-party computing system 170 may be associated with an ESG rating agency such as Sustainalytics ESG Risk Ratings, MSCI ESG Ratings, Bloomberg ESG Disclosures Scores, etc.

In turn, the ESG rating agency may then use the submitted data units in generating a ESG rating (e.g., score) for the entity. Thus, the data retrieval computing system 100 in various aspects can assist the entity in automatically submitting the needed data units to facilitate the generating of the ESG rating for the entity. In some aspects, the data retrieval computing system 100 can submit the data units for the entity in instances when the data units have been revised and/or updated for the entity. Therefore, the data retrieval computing system 100 can assist the entity with keeping its ESG rating up-to-date and current.

In yet another example, the tenant module 125 may initiate an analysis to be conducted on the retrieved data units. Here, the tenant module 125 (or some other module) may access one or more of the data units from the records found in the repository 140 for the corresponding delegates and use the data units in conducting an analysis such as identifying any gaps the entity may have with meeting requirements set for in the ESG metrics and/or any ESG metrics the entity is underperforming and/or over performing on with respect to peer entities. In additional or alternative aspects, the tenant module 125 may submit the one or more data units to independent computational software for conducting the analysis.

In certain aspects, the tenant module 125 (or some other module) may use computational tools such as machine-learning models in performing the analysis. For example, the tenant module 125 may use a machine-learning model such as a multilabel classification model used for processing the data units retrieved for the collection of ESG metrics to generate a feature representation (e.g., a feature vector) having components representing different ESG metrics. Each component may provide a value with respect to an analytical measure for an associated ESG metric. For example, each component may provide a value indicating whether the entity is experiencing a gap in meeting requirements set for the associated ESG metric, whether the entity is underperforming and/or over performing for the associated ESG metric with respect to its peers, and/or the like. Accordingly, the multilabel classification model may be an ensemble of classifiers in which each classifier is used in generating a value for an associated ESG metric. For example, the classifiers may be based on a logistic regression algorithm, support vector machine algorithm, random forest algorithm, and/or the like.

In yet another example, the tenant module 125 may initiate an action to occur within a tenant computing system 160 for the entity. For example, the tenant module 125 (or some other module) may access the tenant computing system 160 of the entity to initiate some action being performed based on one or more of the data units such as adjusting the settings of production machinery to influence the consumption of fuel by the machinery, triggering reporting on certain ESG metrics to senior management, requesting data on certain ESG metrics from an external vendor, and/or the like. Accordingly, the data retrieval computing system 100 (e.g., the tenant module 125) may execute the action within the tenant computing system or the data retrieval computing system 100 (e.g., the tenant module 125) may provide some type of trigger (e.g., data) that invokes the tenant computing system 160 to execute the action.

Data Architecture

Figure 6:
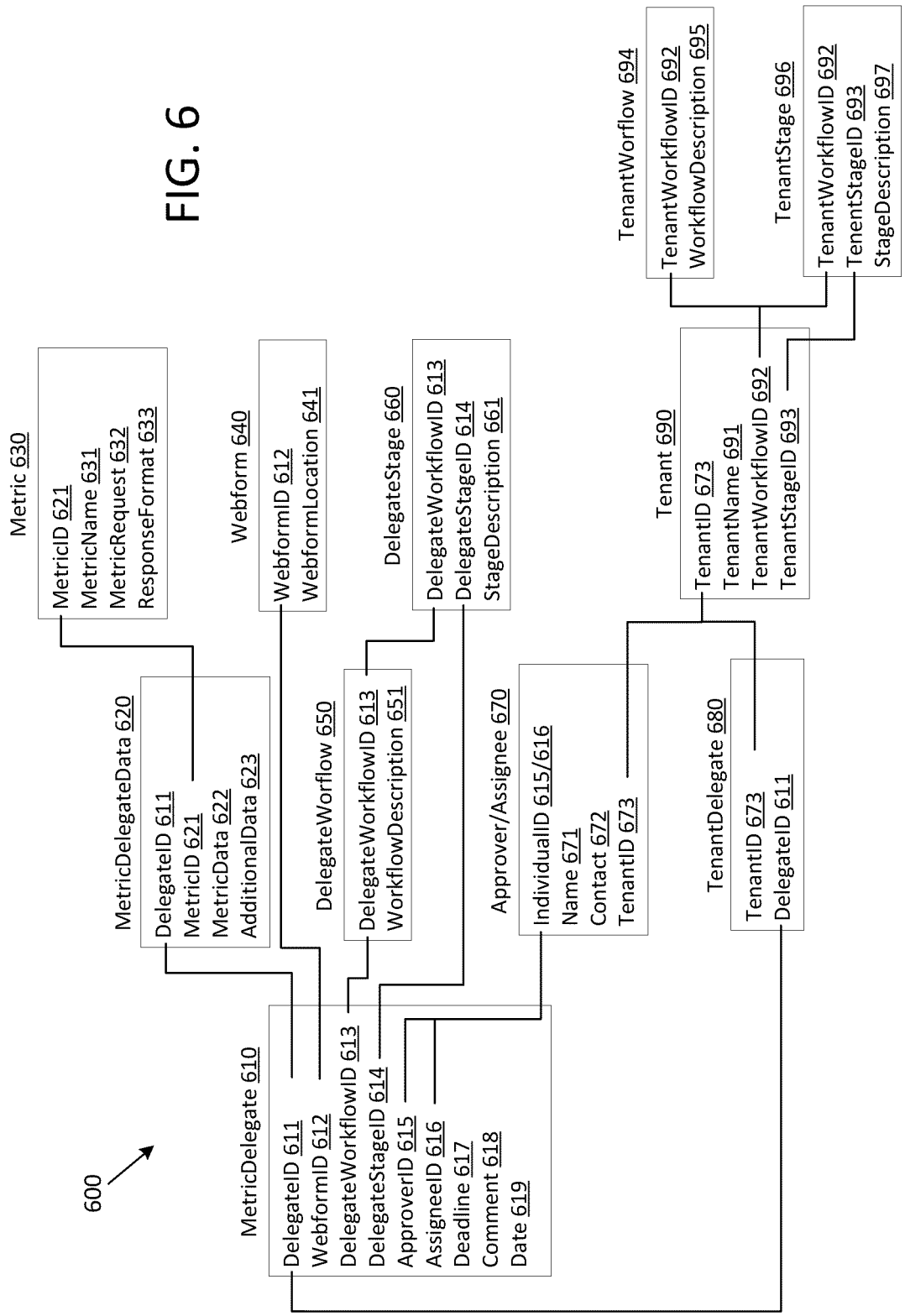
FIG. 6 depicts an example of a data architecture that can be used for storing data that may be used in accordance with various aspects of the present disclosure.

FIG. 6 depicts an example of a data architecture 600 that can be used by the data retrieval computing system 100 for storing and managing data in accordance with various aspects of the present disclosure. Accordingly, the data retrieval computing system 100 can use the data architecture 600 in various aspects in storing the data units for collections of ESG metrics retrieved for various entities that are using the data retrieval service. More specifically, the data retrieval computing system 100 can use the data architecture 600 shown in FIG. 6 in configuring various data structures residing on the repository 140 of the data retrieval computing system 100 that is used in storing the data units for the collections of ESG metrics retrieved for various entities that are using the data retrieval service. For example, the data retrieval computing system 100 may utilize the repository 140 in providing and managing one or more databases that are used in storing the data units. The data architecture 600 shown in FIG. 6 may be configured with different data structures, such as tables, defined for the one or more databases that are used in storing the data units retrieved for collections of ESG metrics for the different entities, along with other supporting data.

The data retrieval computing system 100 can use the data architecture 600 shown in FIG. 6 for storing and supporting data for various entities that may be considered tenants of the data retrieval service. However, for simplicity purposes, the data architecture 600 is discussed herein with respect to the data retrieval computing system's 100 use of the architecture 600 in storing, managing, and supporting data for a particular entity.

In various aspects, the data architecture 600 can include different data structures used in representing various aspects of a delegate. For example, the data architecture 600 shown in FIG. 6 includes a MetricDelegate data structure 610 that is used by the data retrieval computing system 100 for storing records on different delegates found in a set of delegates defined by the entity (e.g., personnel thereof) for a collection of ESG metrics. The MetricDelegate data structure 610 includes a DelegateID field 611 that is used in storing a unique identifier for a delegate defined by the entity. In addition, the MetricDelegate data structure 610 includes a WebformID field 612 that is used in storing a unique identifier for a webform (graphical user interface) generated and maintained for the delegate. The MetricDelegate data structure 610 further includes a DelegateWorkFlowID field 613 that is used in storing a unique identifier that identifies a delegate workflow for the delegate, as well as a DelegateStageID field 614 that is used in storing a unique identifier that identifies a current delegate stage for the delegate workflow. Likewise, the MetricDelegate data structure 610 includes an ApproverID field 615 and an AssigneeID field 616 that are used in storing unique identifiers for an approver (e.g., ESG officer) and an assignee, respectfully, for the delegate.

The MetricDelegate data structure 610 can also include a Deadline field 617 that can be used in storing a date as a deadline for the corresponding assignee providing the data units for the one or more ESG metrics defined for the delegate. The MetricDelegate data structure 610 can also include a Comment field 618 to allow the approver to record a comment for the delegate. Finally, the MetricDelegate data structure 610 can also include a Date field 619 that can be used to store a date associated with a last time the record for the delegate was updated such as, for example, a last time the record for the delegate was updated to reflect an updated delegate stage.

The data architecture 600 also includes a MetricDelegateData data structure 620 that can be used by the data retrieval computing system 100 in storing records on the data units retrieved for one or more ESG metrics defined for a delegate. The MetricDelegateData data structure 620 includes a DelegateID field 611 that can be used for storing the unique identifier for the delegate. In addition, the MetricDelegateData data structure 620 includes a MetricID field 621 that can be used for storing a unique identifier for the ESG metric defined for the delegate. Accordingly, multiple records can be stored in the MetricDelegateData data structure 620 to represent multiple ESG metrics that may be defined for a particular delegate. Further, the MetricDelegateData data structure 620 includes a MetricData field 622 that can be used in storing the data unit retrieved for the ESG metric. Furthermore, the MetricDelegateData data structure 620 includes an AdditionalData field 623 that can be used in storing additional data that may have been requested for the ESG metric.

The data architecture 600 also includes a Metric data structure 630 that can be used by the data retrieval computing system 100 for storing records on the various ESG metrics that are available to the entity for retrieving data units on through the data retrieval service. The Metric data structure 630 includes a MetricID field 621 used for storing the unique identifier that identifies the ESG metric. The Metric data structure 630 also includes a MetricName field 631 that can be used in storing a name for the metric such as "Carbon Emissions." In addition, the Metric data structure 630 includes a MetricRequest field 632 that can be used in storing a request (e.g., request statement) to display on a webform (graphical user interface) to solicit the data unit for the ESG metric. In addition, the Metric data structure 630 includes a ResponseFormat field 633 that can be used for storing a format that the data unit should be provided in for the ESG metric. For example, the format may be a text, numeric, percentage, and/or the like.

The data architecture 600 also includes a Webform data structure 640 that can be used by the data retrieval computing system 100 for storing records on the webforms (graphical user interfaces) generated for the different delegates defined for the collection of ESG metrics selected by the entity. In some aspects, the graphical user interfaces may be in other forms of interface than a webform such as, for example, graphical user interfaces that are provided through a software application such as a mobile device application. The Webform data structure includes a WebformID field 612 that can be used to store the unique identifier for the webform (graphical user interface), as well as a WebformLocation field 641 that can be used to store data on a location at which the webform is stored. Accordingly, the data retrieval computing system 100 can use the data stored in the WebformLocation field 641 in retrieving the webform to provide to an assignee defined for a delegate.

The data architecture 600 also includes a DelegateWorkflow data structure 650 that can be used by the data retrieval computing system 100 in storing records on the different delegate workflows that are made available to the entity through the data retrieval service. The DelegateWorkflow data structure 650 includes the DelegateWorkflowID field 613 for storing the unique identifier for the delegate workflow. In addition, the DelegateWorkflow data structure 650 includes a WorkflowDescription field 651 that can be used to store a description of the delegate workflow. In conjunction with the DelegateWorkFlow data structure 650, the data architecture 600 includes a DelegateStage data structure 660 that can be used by the data retrieval computing system 100 in storing records on the different stages of the delegate workflows. The DelegateStage data structure 660 includes a DelegateWorkflowID field 613 that is used to store the unique identifier for the delegate workflow associated with a delegate stage. The DelegateStage data structure 660 also includes a DelegateStageID field 614 that is used to store the unique identifier for the delegate stage and a StageDescription field 661 that can be used to store a description of the delegate stage.

The data architecture 600 also includes an Approver/Assignee data structure 670 that can be used by the data retrieval computing system 100 in storing records on one or more approvers and/or assignees for the entity that may be involved with retrieving, storing, and managing the data units for the collection of ESG metrics identified by the entity. The Approver/Assignee data structure 670 includes an IndividualID field 615/616 that is used to store a unique identifier for the approver and/or assignee. The Approver/Assignee data structure 670 also includes a Name field 671 for storing the name of the approver and/or assignee, as well as a Contact field 672 for storing a contact (e.g., email address) for the approver and/or assignee. The Approver/Assignee data structure 670 also includes a TenantID field 673 that can be used to store a unique identifier that identifies the entity to represent that the approver and/or assignee is associated with the entity.

As noted, the data architecture 600 can be used by the data retrieval computing system 100 in storing data for multiple entities (e.g., multiple tenants). Therefore, the data architecture 600 can include a TenantDelegate data structure 680 that can be used by the data retrieval computing system in storing records to indicate the set of delegates that have been defined through the data retrieval service for a particular entity. The TenantDelegate data structure 680 includes a TenantID field 673 and a DelegateID field 611. Accordingly, the TenantID field 673 and the DelegateID field 611 can be used in storing combinations of unique identifiers for tenants and delegates, respectfully, in records to associate specific delegates with specific tenants.

In addition, the data architecture 600 can include a Tenant data structure 690 used by the data retrieval computing system 100 to store records on different entities (e.g., tenants) using the data retrieval service. The Tenant data structure 690 includes a TenantID field 673 for storing the unique identifier for a particular entity. The Tenant data structure 690 also includes a TenantName field 691 for storing a name of the entity. In addition, the Tenant data structure 690 includes a TenantWorkflowID field 692 for storing a unique identifier identifying the tenant workflow being used by the entity for retrieving the data units for the collection of ESG metrics identified by the entity, as well as a TenantStageID field 693 for storing a unique identifier identifying the current stage for the tenant workflow.

Finally, the data architecture 600 can include a TenantWorkflow data structure 694 and a TenantStage data structure 696 to be used by the data retrieval computing system 100 in storing records on the different tenant workflows and corresponding tenant stages that are made available to the entities through the data retrieval service. The TenantWorkflow data structure 694 includes a TenantWorkflowID field 692 to store the unique identifier for the tenant workflow and a WorkflowDescription field 695 to store a description of the tenant workflow. The TenantStage data structure 696 includes a TenantWorkflowID field 692 to store the unique identifier for the tenant workflow, a TenantStageID field 693 to store a unique identifier for the tenant stage, and a StageDescription field 697 for storing a description of the tenant stage.

As noted, the data retrieval computing system 100 in various aspects can use the data architecture 600 in storing the data units for collections of ESG metrics retrieved for various entities that are using the data retrieval service, as well as supporting data for the collections of ESG metrics. As an example, the data retrieval computing system 100 initially displays a listing of ESG metrics to personnel of an entity via a graphical user interface (e.g., webpage) provided through the data retrieval service. The data retrieval computing system 100 queries the listing of ESG metrics from the Metric data structure 630 to display the names of the different ESG metrics as stored in the MetricName field 631 of the various records stored in the Metric data structure 630 for the different ESG metrics.

The data retrieval computing system 100 can receive a selection of a particular ESG metric by the personnel from the listing of ESG metrics and in response, displays a listing of assignees associated with the entity on the same or a different graphical user interface. The data retrieval computing system 100 queries the listing of assignees from the Approver/Assignee data structure 670 by using the unique identifier for the entity (tenant) to query the identifiers stored in the TenantID field 673 of each of the records stored in the Approver/Assignee data structure 670. The data retrieval computing system 100 then receives a selection made by the personnel of a particular assignee from the listing of assignees displayed on the graphical user interface, as well as additional data for the delegate such as, for example, a delegate workflow to apply to the delegate and/or a deadline for the selected assignee to provide the data unit for the particular ESG metric.

In response, the data retrieval computing system 100 executes the delegate module 110 in storing the delegate (one or more records thereof) in the repository 140 for the entity. Accordingly, the delegate module 110 receives the data for the delegate and generates a delegate record for the delegate and stores the record in the MetricDelegate data structure 610. The delegate record may include an identifier for the delegate stored in the DelegateID field 611, an identifier for the delegate workflow selected for the delegate in the DelegateWorkflowID field 613, an identifier for the delegate stage set for the delegate (e.g., "In Retrieval") in the DelegateStageID field 614, an identifier for the personnel (approver) stored in the ApproverID field 615, a unique identifier for the assignee selected by the personnel in the AssigneeID field 616, and a deadline for retrieving the art units for the particular ESG metric in the Deadline field 617.

In addition, the delegate module 110 generates a graphical user interface to solicit the data unit for the particular ESG metric. The delegate module 110 queries the request (e.g., request statement) to display on the graphical user interface from the Metric data structure 630 using the identifier for the particular ESG metric via the MetricID field 621 to retrieve the request from the MetricRequest field 632 of the record stored for the particular ESG metric. In addition, the delegate module 110 can query the format for the data unit from the ResponseFormat field 633 of the record. The delegate module 110 can also update the WebformID field 612 of the record stored in the MetricDelegate data structure 610 for the delegate, as well as generate a record to store in the Webform data structure 640 once the delegate module 110 has generated and stored the graphical user interface.

The delegate module 110 then sends a notification to the assignee defined for the delegate to solicit the data unit for the particular ESG metric. Here, the delegate module 110 uses the identifier stored in the AssigneeID field 616 of the record stored in the MetricDelegate data structure 610 for the delegate to query the contact for the assignee from the Contact field 672 of the record stored in the Approver/Assignee data structure 670 for the assignee.

The delegate module 110 receives an indication of activation of the link provided in the notification and provides access the graphical user interface generated for the delegate to a computing device from which the link was activated. The data retrieval computing system 100 receives a request for the graphical user interface. In turn, the data retrieval computing system 100 executes the metric data module 115. The metric data module 115 uses an identifier for the delegate that may have been provided by the data retrieval computing system 100 to query the identifier for the graphical user interface from the WebformID field 612 of the record stored in the MetricDelegate data structure 610 for the delegate. The metric data module 115 then uses the identifier for the graphical user interface to query the location of the graphical user interface from the WebformLocation field 641 of the record stored in the Webform data structure 640 for the graphical user interface.

The metric data module 115 retrieves the graphical user interface from the location and provides the graphical user interface for display to the assignee. The data retrieval computing system 100 then receives the data unit provided by the assignee through the graphical user interface for the particular ESG metric and provides the data unit to the metric data module 115. In turn, the metric data module 115 generates a record for the particular ESG metric and stores the record in the MetricDelegateData data structure 620 along with the identifier for the delegate in the DelegateID field 611, identifier for the ESG metric in the MetricID field 621, and the data unit received for the ESG metric from the assignee in the MetricData field 622. The metric data module 115 also updates the DelegateStageID field 614 of the record stored in the MetricDelegate data structure 610 for the delegate to reflect the delegate is now in the "In Review" stage of the delegate workflow.

The metric data module 115 sends a notification to the personnel (e.g., approver) for the entity to indicate to the personnel that the data unit for the particular ESG metric has been provided by the assignee and is available for review. The metric data module 115 performs this task by using the identifier stored in the ApproverID field 615 of the record stored in the MetricDelegate data structure 610 for the delegate to query the contact for the personnel from the Contact field 672 of the record stored in the Approver/Assignee data structure 670 for the personnel. Accordingly, the personnel accesses the data retrieval service, views the data unit via a graphical user interface, and requests additional data for the ESG metric or approves the data unit collected for the ESG metric.

Accordingly, the data retrieval computing system 100 receives an approval of the data unit and in response, execute the tenant module 125. The tenant module 125 updates the DelegateStageID field 614 of the record stored in the MetricDelegate data structure 610 for the delegate to reflect the delegate is now in the "Approved" stage of the delegate workflow. The tenant module 125 then determines whether the entity has any outstanding delegates with data units that still need to be retrieved for the corresponding ESG metrics. Here, the tenant module 125 queries the TenantDelegate data structure 680 using an identifier for the entity and the TenantID field 673 to identify the records in the TenantDelegate data structure 680 associated with the tenant. The tenant module 125 reads the identifiers for the set of delegates defined for the entity from the DelegateID field 611 of the records queried from the TenantDelegate data structure 680. The tenant module 125 then queries the records for the set of delegates in the MetricDelegate data structure 610 using the identifiers for the delegates to determine from the DelegateStageID fields of the records whether any of the delegates for the entity are still outstanding.

If all the delegates for the entity are in the "Approved" stage of the delegate workflow, then the tenant module 125 updates the TenantStageID field 693 of the record stored in the Tenant data structure 690 for the tenant to reflect the collection of ESG metrics to be retrieved for the entity are now in the "Completed" stage. In addition, the tenant module 125 can initiate one or more actions to be performed based on the data units retrieved for the collection of ESG metrics.

For example, the tenant module 125 can initiate the generation of one or more reports based on the data units retrieved for the collection of ESG metrics. Here, the tenant module 125 (or some other module) can query the data units retrieved for one or more of the collection of ESG metrics from the MetricDelegateData data structure 620 using combinations of the identifier(s) for the corresponding delegate(s) and the identifiers for the one or more ESG metrics to query the DelegateID field 611 and the MetricID field 621 to identify the records stored in the MetricDelegateData data structure 620 for the one or more ESG metrics. The tenant module 125 (or some other module) can then read the data units from the MetricData field 622 of the records returned in the query. Accordingly, the tenant module 125 (or some other module) can then generate the one or more reports using the data units read from the records.

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some aspects, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 7:
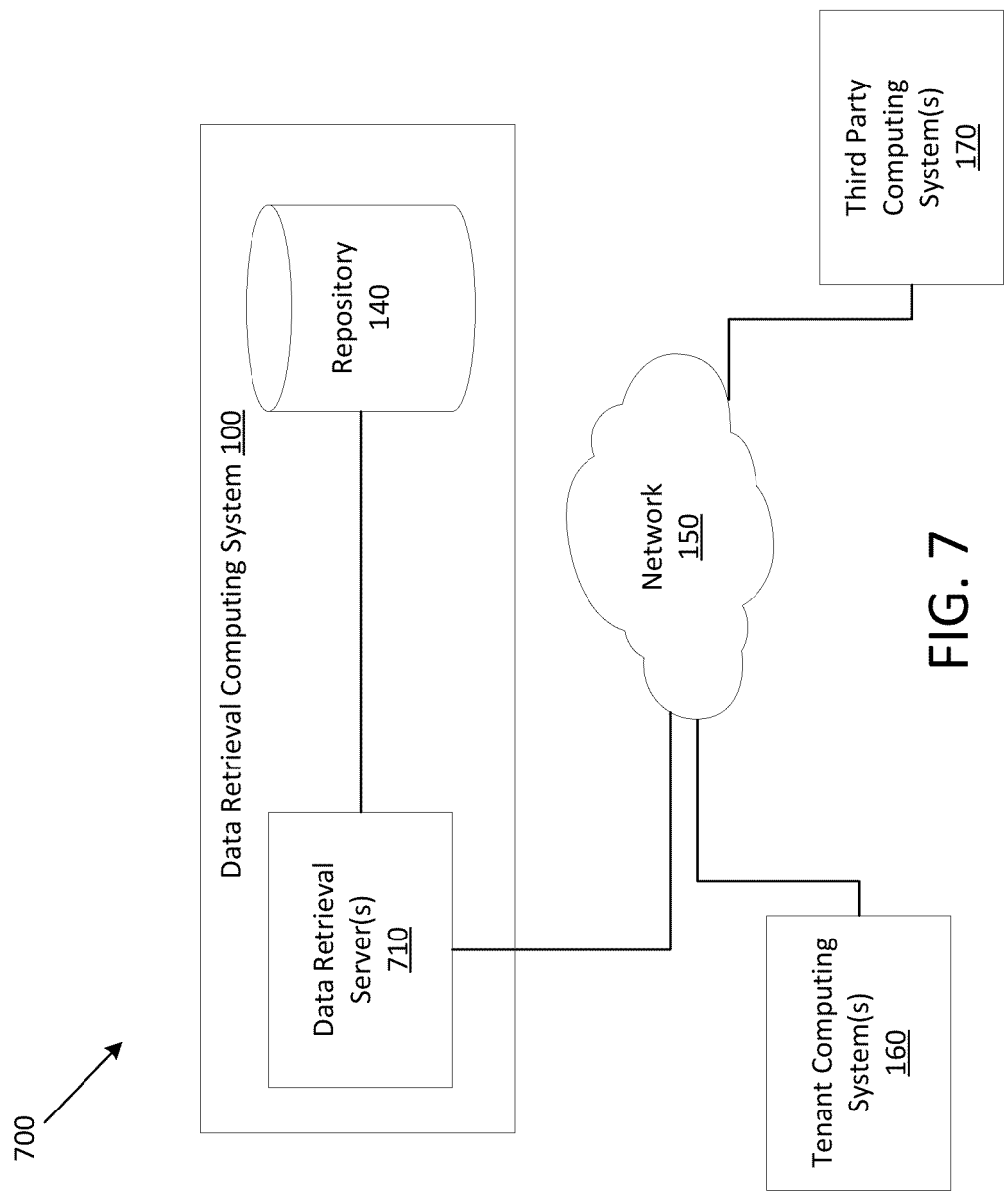
FIG. 7 depicts an example of a system architecture that may be used in accordance with various aspects of the present disclosure.

FIG. 7 is a block diagram of a system architecture 700 that can be used in assisting entities in accessing, retrieving, and processing data stored within data sources located on multiple computing systems for the entities in various aspects as detailed herein. As may be understood from FIG. 7, the system architecture 700 in some aspects may include a data retrieval computing system 100 that comprises one or more data retrieval servers 710 and a data repository 140. The data repository 140 may be made up of computing components such as servers, routers, data storage, networks, and/or the like that are used on the data retrieval computing system 100 to store and manage data units retrieved for various entities from multiple computing systems associated with the entities.

As previously noted, the data retrieval computing system 100 may provide a data retrieval service to various entities that is available over one or more networks 150. Here, an entity may access the service via a tenant computing system 160 associated with the entity. For example, the data retrieval computing system 100 may provide the service through a website that is accessible to the entity's tenant computing system 160 over the one or more networks 150.

According, the data retrieval server(s) 710 may execute a delegate module 110, a metric data module 115, an additional data module 120, and a tenant module 125 as described herein. Further, according to particular aspects, the data retrieval server(s) 710 may provide one or more graphical user interfaces (e.g., one or more webpages, webform, and/or the like through the website) through which personnel of an entity can interact with the data retrieval computing system 100. Furthermore, the data retrieval server(s) 710 may provide one or more interfaces that allow the data retrieval computing system 100 to communicate with tenant computing system(s) 160 and/or third-party computing system(s) 170 such as one or more suitable application programming interfaces (APIs), direct connections, and/or the like.

Example Computing Hardware

Figure 8:
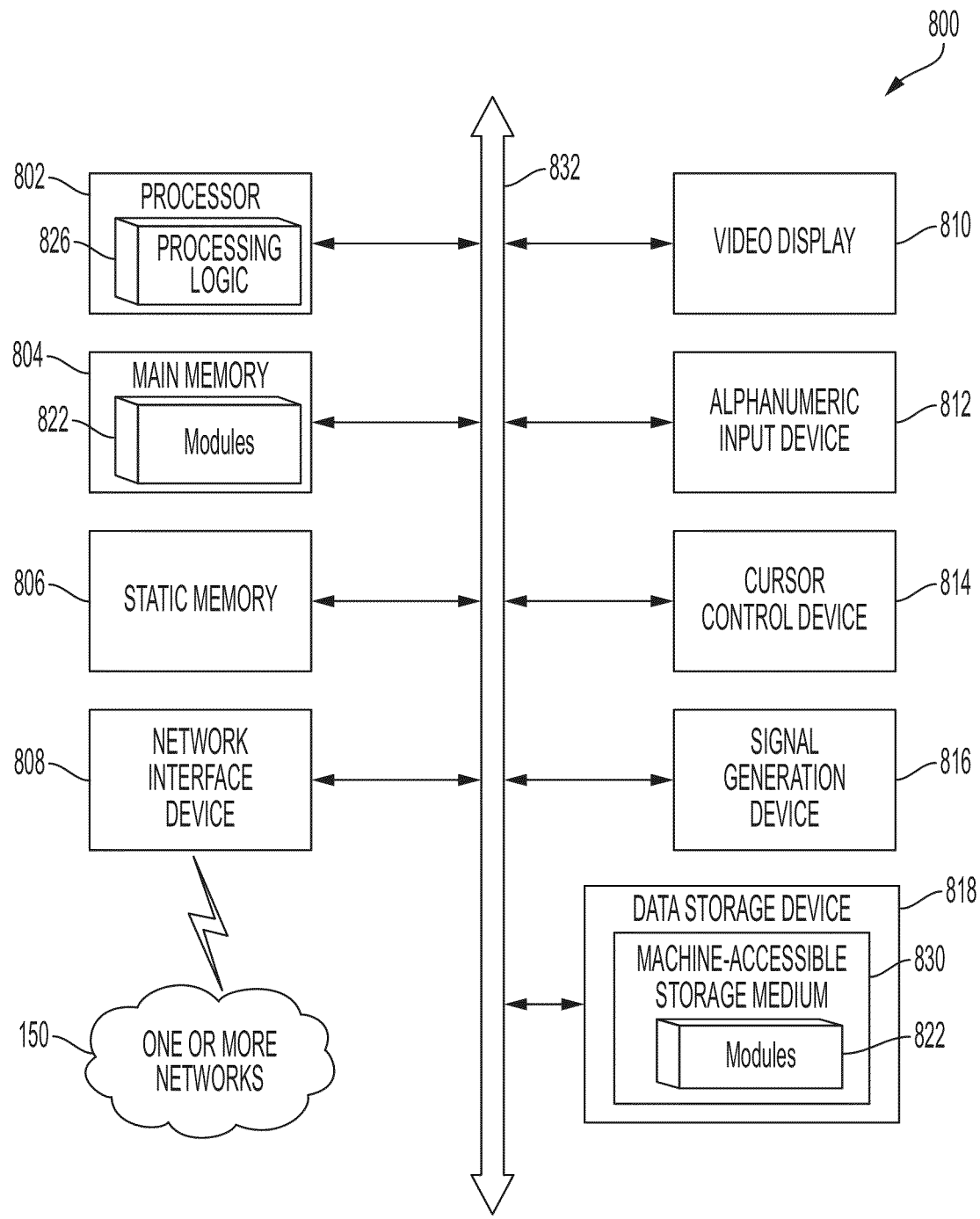
FIG. 8 depicts an example of a computing entity that may be used in accordance with various aspects of the present disclosure.

FIG. 8 illustrates a diagrammatic representation of a computing hardware device 800 that may be used in accordance with various aspects. For example, the hardware device 800 may be computing hardware such as a data retrieval server 710 as described in FIG. 7. According to particular aspects, the hardware device 800 may be connected (e.g., networked) to one or more other computing entities, storage devices, and/or the like via one or more networks such as, for example, a LAN, an intranet, an extranet, and/or the Internet. As noted above, the hardware device 800 may operate in the capacity of a server and/or a client device in a client-server network environment, or as a peer computing device in a peer-to-peer (or distributed) network environment. In some aspects, the hardware device 800 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 800 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 800 includes a processor 802, a main memory 804 (e.g., read-only memory (ROM), flash memory, dynamic random-access memory (DRAM) such as synchronous DRAM (SDRAM), Rambus DRAM (RDRAM), and/or the like), a static memory 806 (e.g., flash memory, static random-access memory (SRAM), and/or the like), and a data storage device 818, that communicate with each other via a bus 832.

The processor 802 may represent one or more general-purpose processing devices such as a microprocessor, a central processing unit, and/or the like. According to some aspects, the processor 802 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 802 may be one or more special-purpose processing devices such as an application specific integrated circuit (ASIC), a field programmable gate array (FPGA), a digital signal processor (DSP), network processor, and/or the like. The processor 802 can execute processing logic 826 for performing various operations and/or steps described herein.

The hardware device 800 may further include a network interface device 808, as well as a video display unit 810 (e.g., a liquid crystal display (LCD), a cathode ray tube (CRT), and/or the like), an alphanumeric input device 812 (e.g., a keyboard), a cursor control device 814 (e.g., a mouse, a trackpad), and/or a signal generation device 816 (e.g., a speaker). The hardware device 800 may further include a data storage device 818. The data storage device 818 may include a non-transitory computer-readable storage medium 830 (also known as a non-transitory computer-readable storage medium or a non-transitory computer-readable medium) on which is stored one or more modules 822 (e.g., sets of software instructions) embodying any one or more of the methodologies or functions described herein. For instance, according to particular aspects, the modules 822 include a delegate module 110, a metric data module 115, an additional data module 120, and/or a tenant module 125 as described herein. The one or more modules 822 may also reside, completely or at least partially, within main memory 804 and/or within the processor 802 during execution thereof by the hardware device 800—main memory 804 and processor 802 also constituting computer-accessible storage media. The one or more modules 822 may further be transmitted or received over a network 150 via the network interface device 808.

While the computer-readable storage medium 830 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 800 and that causes the hardware device 800 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

Conclusion

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

The invention claimed is:

1. A system comprising:
 a non-transitory computer-readable medium storing instructions; and
 a processing device communicatively coupled to the non-transitory computer-readable medium, wherein the processing device is configured to execute the instructions and thereby perform operations comprising:
 retrieving data stored within data sources located on a plurality of computing systems which require different permissions or credentials to access, by:
 receiving a set of delegates that represent a plurality of data units stored within the plurality of computing systems and a plurality of assignees who have access to the plurality of data units stored within the plurality of computing systems, wherein each delegate comprises;
 a data construct identifying a corresponding data unit from the plurality of data units, and
 a corresponding assignee who has access to a corresponding computing system from the plurality of computing systems to retrieve the corresponding data unit;
 generating and configuring a respective customized graphical user interface for each delegate of the set of delegates to include a respective display element that includes a request for the corresponding data unit and an input element for receiving the corresponding data unit;
 generating a corresponding delegate record for each delegate of the set of delegates, wherein the corresponding delegate record identifies the corresponding data unit and the respective customized graphical user interface and is stored in a centralized repository;
 generating a corresponding electronic communication for each delegate of the set of delegates, wherein the corresponding electronic communication comprises a link to access the respective customized graphical user interface;
 identifying, for each delegate, a respective assignee from the plurality of assignees;
 transmitting the corresponding electronic communication for each delegate of the set of delegates to the respective assignee;
 receiving one or more of the plurality of data units via the respective customized graphical user interface; and
 recording the received one or more of the plurality of data units in one or more delegate records in the centralized repository.

2. The system of claim 1, wherein:
 the operations further comprise:
 receiving an indication of an activation of the link in the corresponding electronic communication on a computing device associated with the respective assignee; and
 responsive to receiving the indication of the activation of the link, causing the computing device to access the respective customized graphical user interface;
 receiving the one or more of the plurality of data units comprises receiving, from the computing device via the respective customized graphical user interface, the corresponding data unit for a particular delegate of the set of delegates; and
 recording the received one or more of the plurality of data units comprises recording the corresponding data unit for the particular delegate in the corresponding delegate record for the particular delegate.

3. The system of claim 2, the operations further comprising:
 receiving a subsequent request associated with the corresponding data unit; and
 responsive to receiving the subsequent request:
 modifying, based on the subsequent request, the respective customized graphical user interface to generate a modified graphical user interface for the particular delegate, wherein the modified graphical user interface requests additional data that is required for the corresponding data unit; and generating a second corresponding electronic communication for the particular delegate that includes a second link to access the modified graphical user interface.

4. The system of claim 3, the operations further comprising:

receiving an indication of an activation of the second link in the second corresponding electronic communication on the computing device;

responsive to receiving the indication of the activation of the second link, causing the computing device to access the modified graphical user interface;

receiving, from the computing device via the modified graphical user interface, the additional data; and modifying the corresponding data unit for the particular delegate in the corresponding delegate record for the particular delegate to include the additional data.

5. The system of claim 2, wherein the operations further comprise:

identifying a data type of the corresponding data unit;

determining that the data type is not a desired data type; and responsive to determining that the data type is not the desired data type, facilitating correction of the corresponding data unit from the data type to the desired data type.

6. The system of claim 5, wherein facilitating correction of the corresponding data unit from the data type to the desired data type comprises at least one of:

transforming the corresponding data unit from the data type to the desired data type; or generating a second modified graphical user interface that includes a second display element that includes a second request for the corresponding data unit in the desired data type and a second input element for receiving the corresponding data unit in the desired data type and providing the second modified graphical user interface for display on the computing device.

7. The system of claim 2, wherein the operations further comprise, in response to receiving each of the plurality of data units:

accessing at least one of the plurality of data units from the corresponding delegate record; and initiating network communication for transferring the at least one of the plurality of data units to a third-party computing system.

8. The system of claim 1, wherein the operations further comprise:

analyzing the plurality of data units against a set of metrics to identify a performance gap; and facilitating, based on the performance gap, modification of at least one operating parameter controlled by at least one computing system from the plurality of computing systems.

9. A non-transitory computer-readable medium storing computer-executable instructions that, when executed by computing hardware, configure the computing hardware to perform operations comprising:

retrieving data stored within data sources located on a plurality of computing systems which require different permissions or credentials to access, by:

receiving a set of delegates that represent a plurality of data units stored within the plurality of computing systems and a plurality of assignees who have access to the plurality of data units stored within the plurality of computing systems, wherein each delegate comprises:

a data construct identifying a corresponding data unit from the plurality of data units, and a corresponding assignee who has access to a corresponding computing system from the plurality of computing systems to retrieve the corresponding data unit;

generating and configuring a respective customized graphical user interface for each delegate of the set of delegates to include a respective display element that includes a request for the corresponding data unit and an input element for receiving the corresponding data unit;

generating a corresponding delegate record for each delegate of the set of delegates, wherein the corresponding delegate record identifies the corresponding data unit and the respective customized graphical user interface and is stored in a centralized repository;

identifying, for each delegate, a respective assignee from the plurality of assignees;

providing, to a respective computing device in network communication with a respective computing system of the plurality of computing systems and associated with the respective assignee, the respective customized graphical user interface for display on the respective computing device;

receiving, from each respective computing device via the respective customized graphical user interface, one or more of the plurality of data units; and recording the received one or more of the plurality of data units in one or more delegate records in the centralized repository.

10. The non-transitory computer-readable medium of claim 9, wherein the operations further comprise:

identifying a respective data type of each corresponding data unit;

identifying a subset of the plurality of data units for which the respective data type is not a desired data type; and facilitating modification of the corresponding data unit for each data unit in the subset of the plurality of data units to the desired data type.

11. The non-transitory computer-readable medium of claim 10, wherein facilitating modification of the corresponding data unit for each data unit in the subset of the plurality of data units to the desired data type comprises at least one of:

transforming the corresponding data unit for each data unit in the subset of the plurality of data units to the desired data type; or generating a respective modified graphical user interface that includes a second display element that includes a second request for the corresponding data unit in the desired data type and a second input element for receiving the corresponding data unit in the desired data type and providing the second modified graphical user interface for display on each respective computing device.

12. The non-transitory computer-readable medium of claim 9, wherein the operations further comprise, in response to receiving the one or more of the plurality of data units:

accessing at least one of the plurality of data units from the corresponding delegate record; and initiating network communication for transferring the at least one of the plurality of data units to a third-party computing system.

13. The non-transitory computer-readable medium of claim 9, wherein the operations further comprise:
analyzing the plurality of data units against a set of metrics to identify a performance gap; and
facilitating, based on the performance gap, modification of at least one operating parameter controlled by at least one computing system from the plurality of computing systems.

14. A method comprising:
retrieving data stored within data sources located on a plurality of computing systems which require different permissions or credentials to access, by:
receiving, by computing hardware, a set of delegates that represent a plurality of data units stored within the plurality of computing systems and a plurality of assignees who have access to the plurality of data units stored within the plurality of computing systems, wherein each delegate comprises:
a data construct identifying a corresponding data unit from the plurality of data units, and
a corresponding assignee who has access to a corresponding computing system from the plurality of computing systems to retrieve the corresponding data unit;
generating, by the computing hardware, a corresponding graphical user interface for each delegate of the set of delegates, wherein the corresponding graphical user interface is configured with a respective display element that provides a request for the corresponding data unit and an input element for receiving the corresponding data unit;
generating, by the computing hardware, at least one corresponding delegate record for each delegate of the set of delegates, wherein the at least one corresponding delegate record identifies the corresponding data unit and the corresponding graphical user interface and is stored in a centralized repository;
generating, by the computing hardware, a corresponding electronic communication for each delegate of the set of delegates, wherein the corresponding electronic communication comprises a link to access the corresponding graphical user interface;
sending, by the computing hardware, the corresponding electronic communication for each delegate of the set of delegates to the corresponding assignee;
receiving one or more of the plurality of data units via the corresponding graphical user interface; and
recording the received one or more of the plurality of data units in one or more delegate records in the centralized repository.

15. The method of claim 14, further comprising:
receiving, by the computing hardware, an indication of an assignee computing device associated with the corresponding assignee for a particular delegate of the set of delegates activating the link provided in the corresponding electronic communication sent for the particular delegate;
responsive to receiving the indication, providing, by the computing hardware, the corresponding graphical user interface for the particular delegate for display on the assignee computing device;
receiving, by the computing hardware from the assignee computing device, the corresponding data unit for the particular delegate; and
recording, by the computing hardware, the corresponding data unit for the particular delegate in the at least one corresponding delegate record for the particular delegate.

16. The method of claim 15, wherein the method further comprises:
receiving, by the computing hardware and from a user account having permission to approve the corresponding data unit for the particular delegate, instruction for the corresponding data unit; and
responsive to receiving the instruction:
modifying, by the computing hardware and based on the instruction, the corresponding graphical user interface to generate a modified graphical user interface for the particular delegate, wherein the modified graphical user interface requests additional data that is required for the corresponding data unit;
generating, by the computing hardware, a second electronic communication for the particular delegate, wherein the second electronic communication comprises a link to access the modified graphical user interface; and
sending, by the computing hardware, the second electronic communication for the particular delegate to the corresponding assignee for the particular delegate, wherein upon receipt of the second electronic communication, the corresponding assignee activates the link to access the modified graphical user interface and provide the additional data that is required for the corresponding data unit.

17. The method of claim 16, further comprising:
receiving, by the computing hardware, a second indication of the corresponding assignee for the particular delegate activating the link provided in the second electronic communication;
responsive to receiving the second indication, providing, by the computing hardware, the modified graphical user interface for display to the corresponding assignee for the particular delegate;
receiving, by the computing hardware, the additional data that is required for the corresponding data unit for the particular delegate; and
recording, by the computing hardware, the additional data that is required for the corresponding data unit for the particular delegate in the at least one corresponding delegate record for the particular delegate.

18. The method of claim 14, wherein upon completion of retrieving the plurality of data units, the method further comprises:
accessing, by the computing hardware, at least one of the plurality of data units from the at least one corresponding delegate record;
generating, by the computing hardware and based on the at least one of the plurality of data units, a report; and
providing, by the computing hardware, at least one of a hard copy version of the report for printing or an electronic version of the report for display on a graphical user interface.

19. The method of claim 14, wherein upon completion of retrieving the plurality of data units, the method further comprises:
accessing, by the computing hardware, at least one of the plurality of data units from the at least one corresponding delegate record; and
submitting, by the computing hardware, the at least one of plurality of data units to a third-party computing system.

20. The method of claim 14, further comprising:
analyzing, by the computing hardware, the plurality of data units against a set of metrics;
identifying, by the computing hardware, performance gaps according to the set of metrics based on the analysis; and
modifying, by the computing hardware, one or more operating parameters for one or more of the plurality of computing systems based on the performance gaps.

* * * * *